Jan. 15, 1957 F. CAMPOS 2,777,560
TABULATING MECHANISM FOR CALCULATING MACHINES
Filed Feb. 19, 1951 14 Sheets-Sheet 8
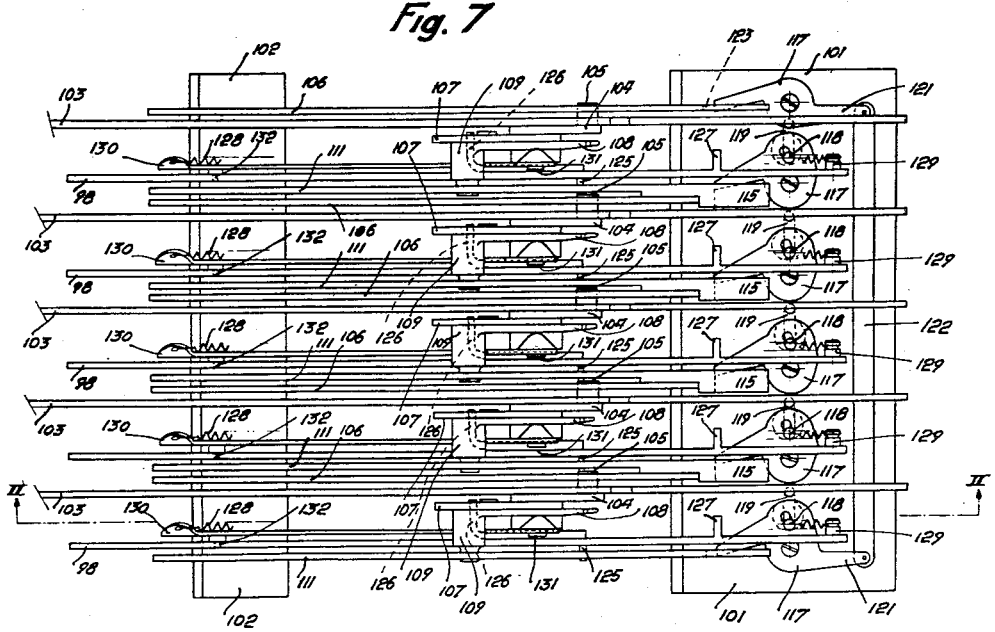
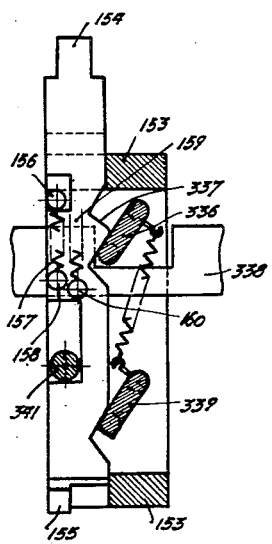
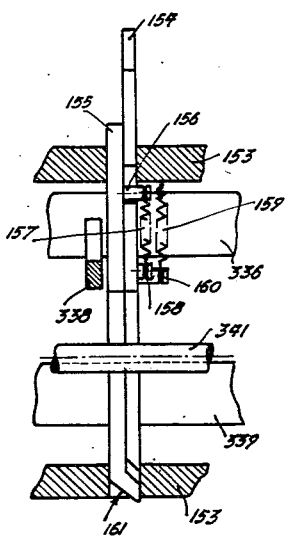
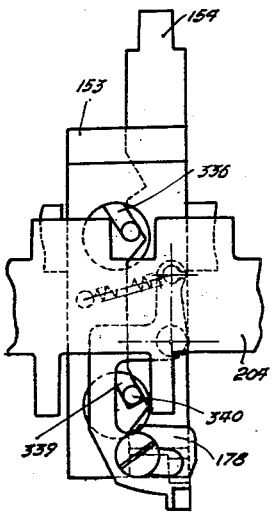
Inventor:-
Francisco Campos
By Allen & Allen
Attorneys

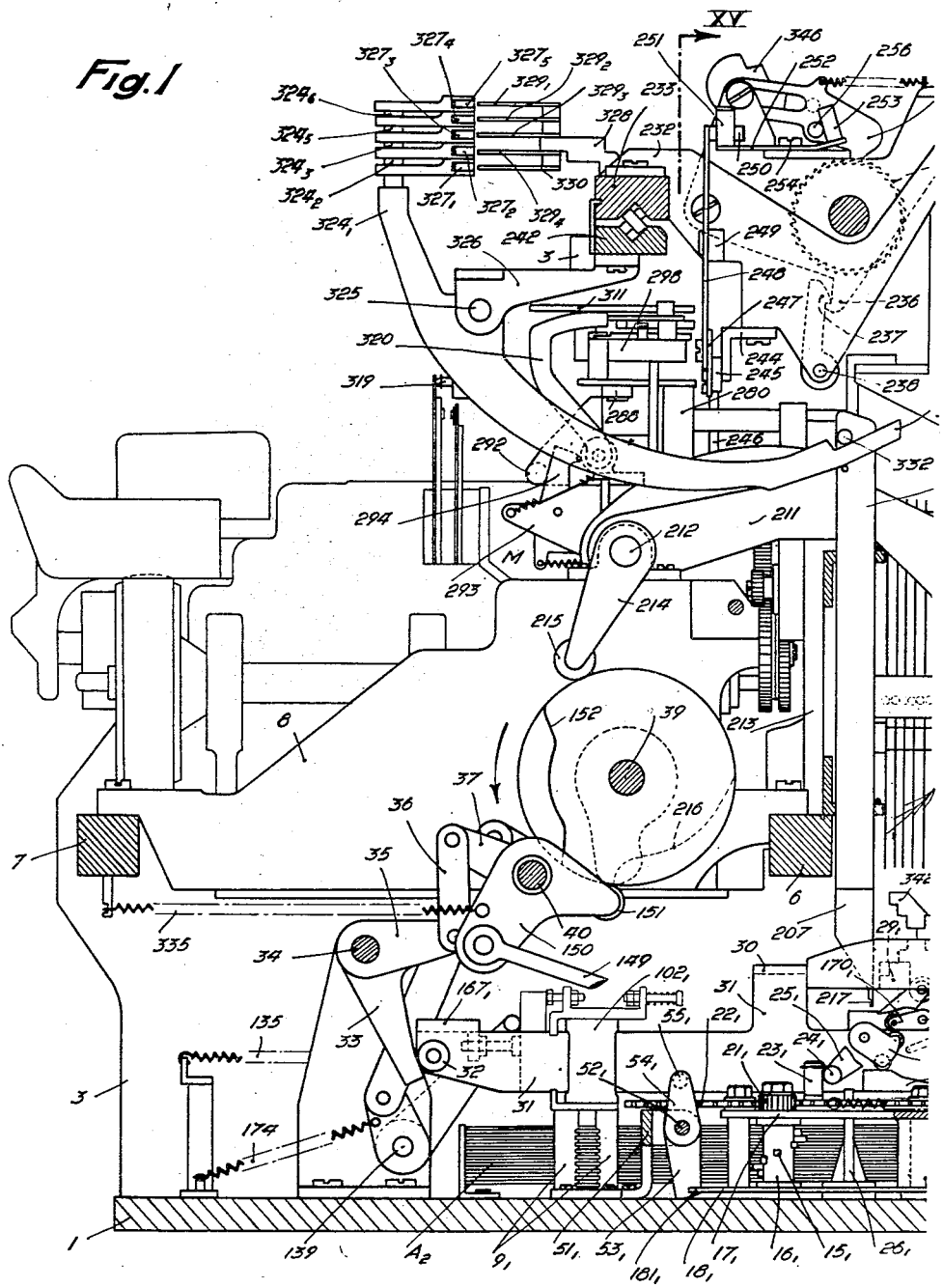

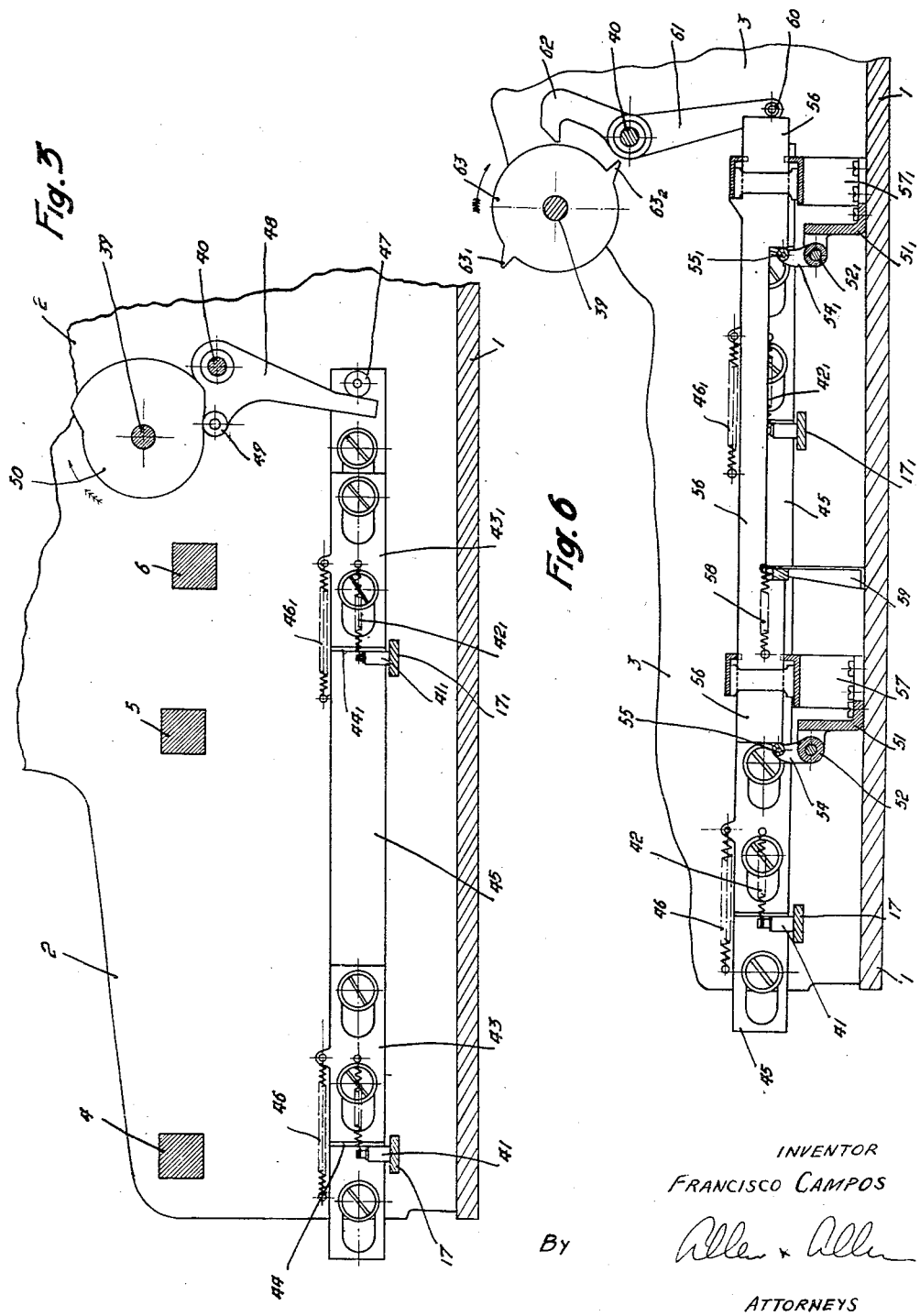

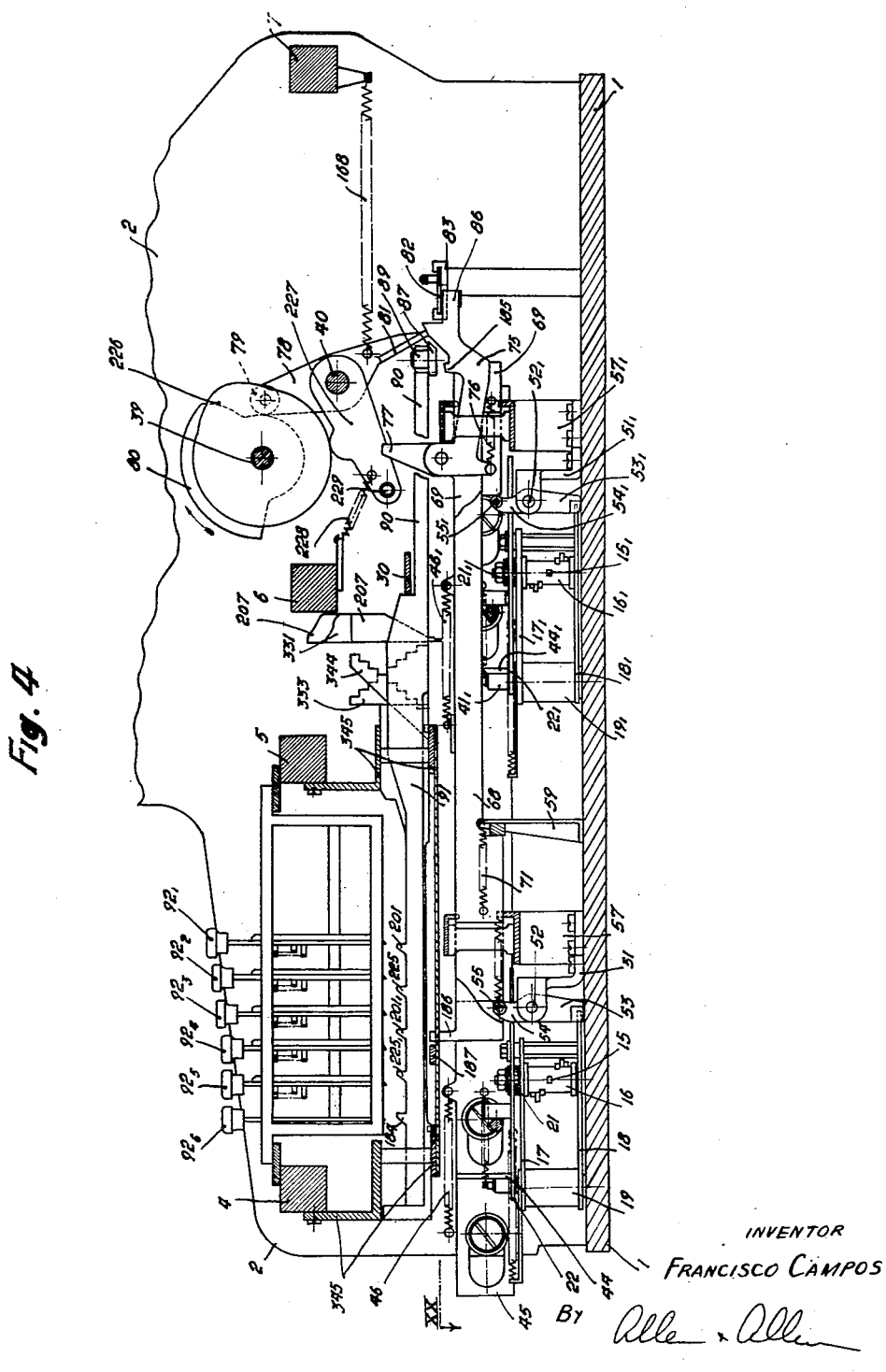

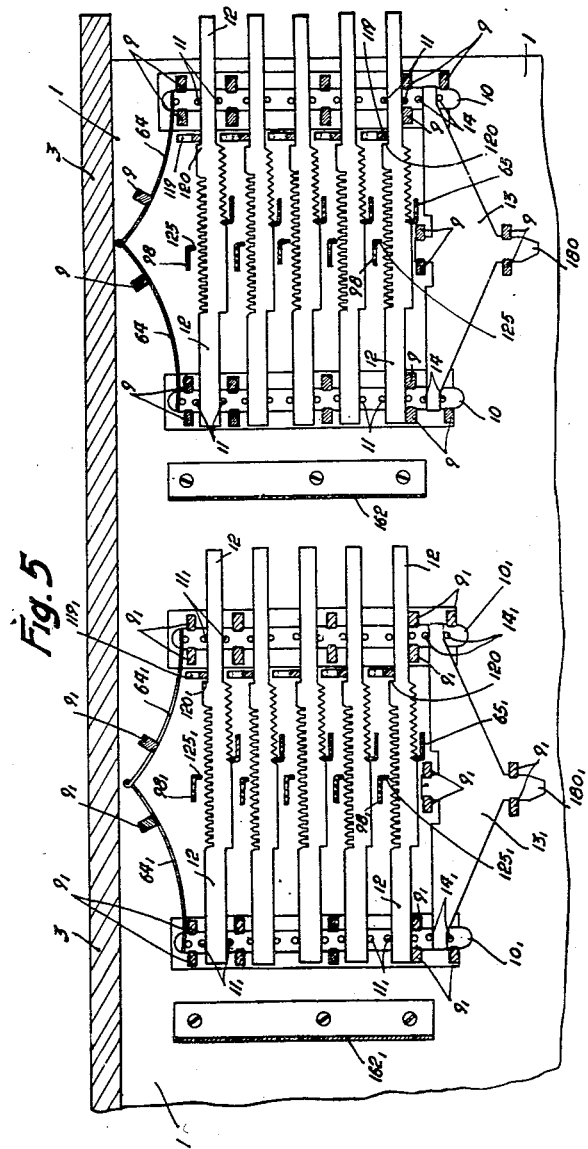

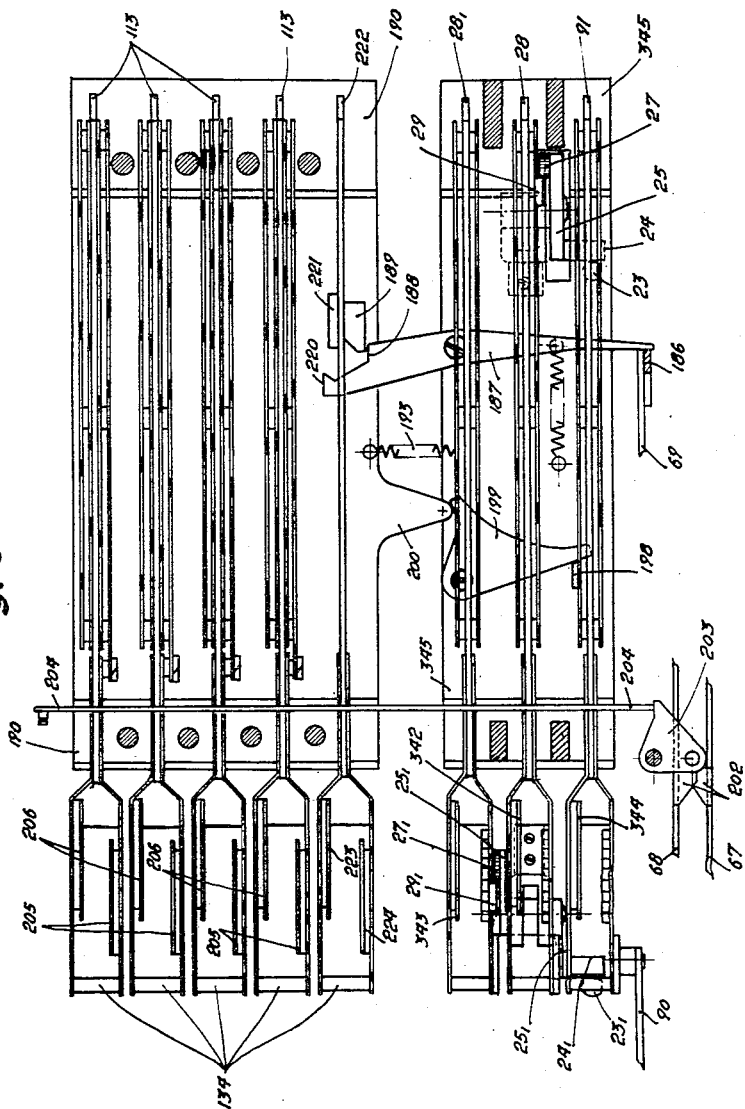

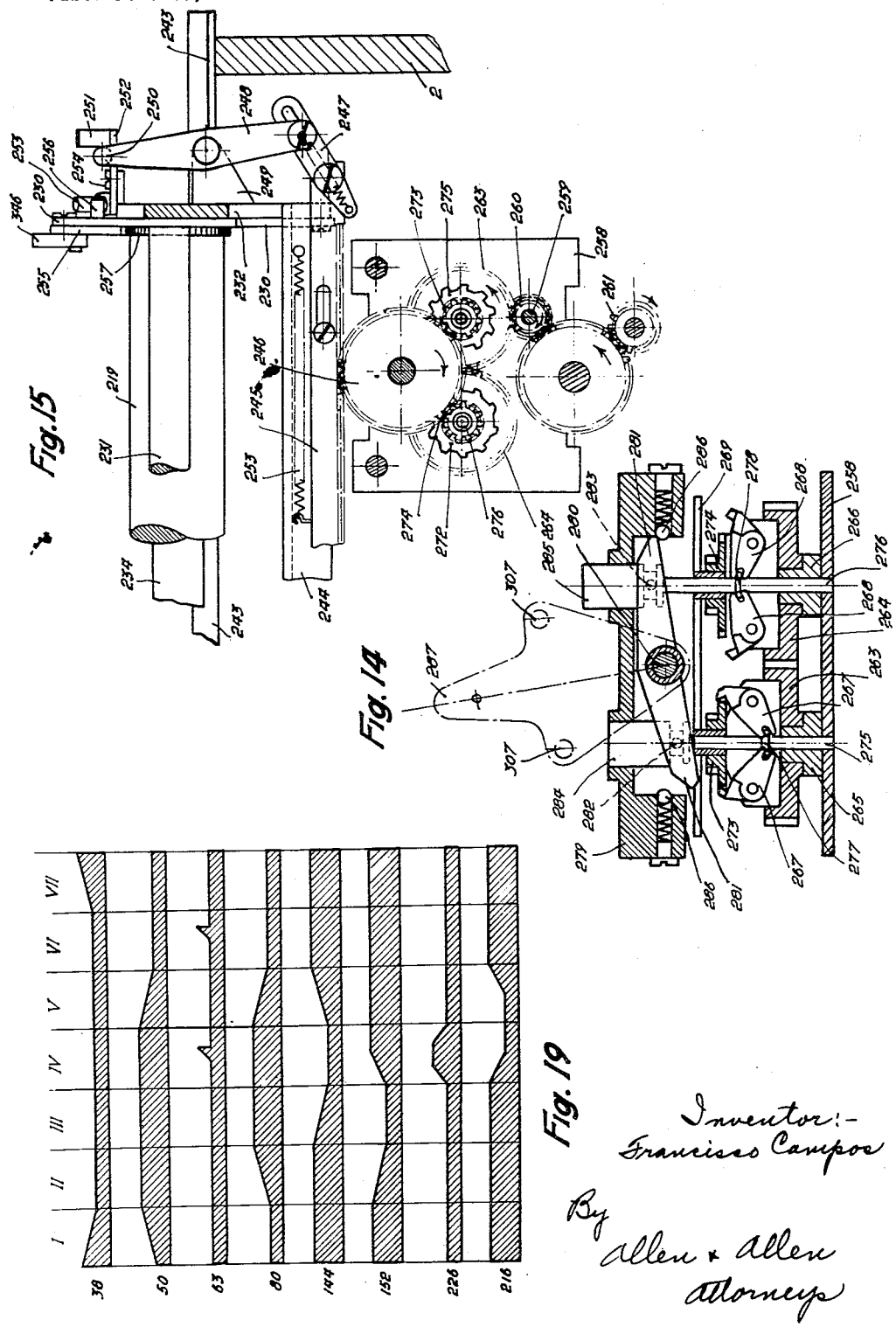

Jan. 15, 1957  F. CAMPOS  2,777,560
TABULATING MECHANISM FOR CALCULATING MACHINES
Filed Feb. 19, 1951  14 Sheets-Sheet 12
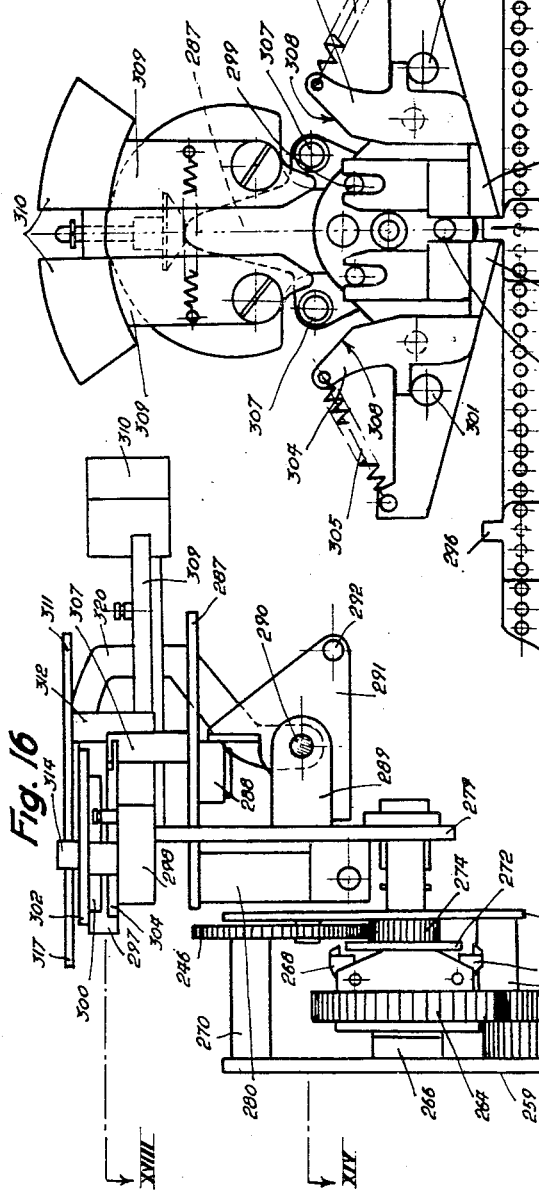
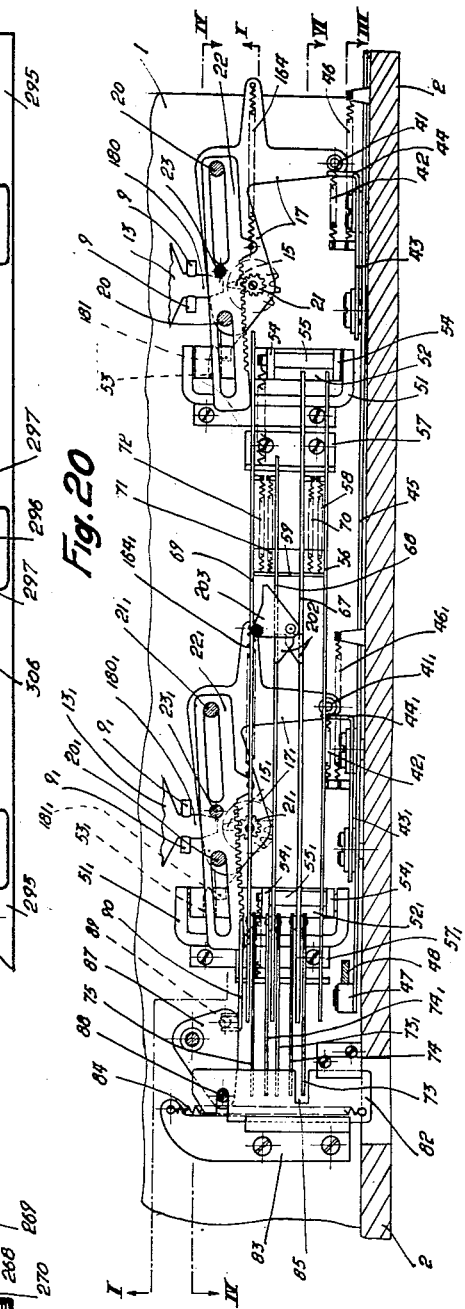
Inventor:
Francisco Campos
By Allen & Allen
attorneys

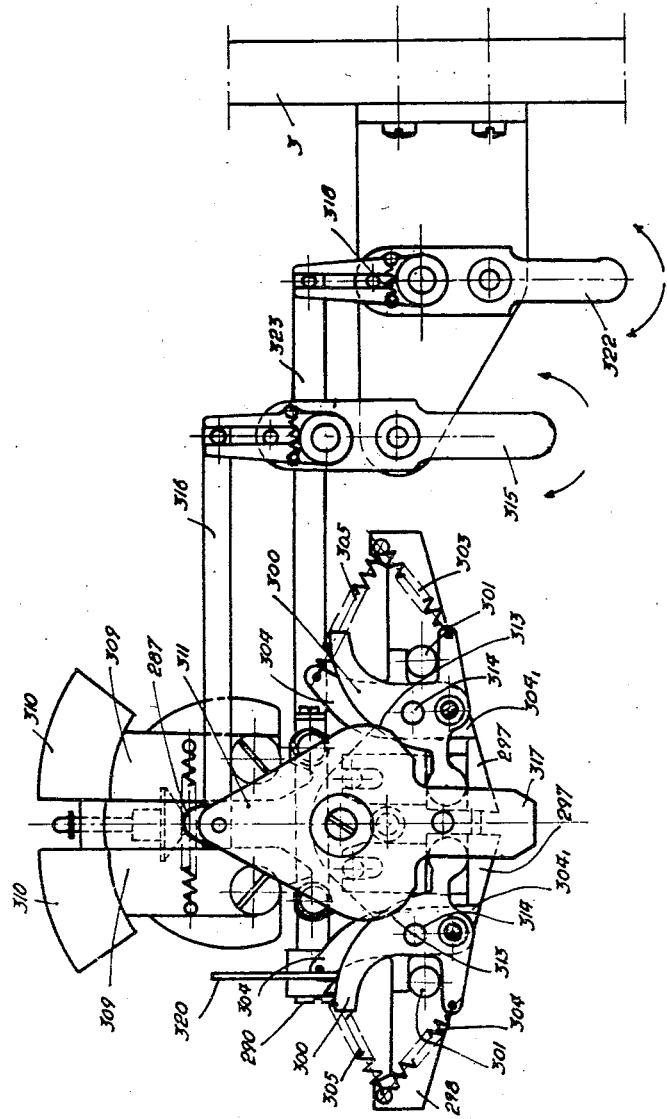

Jan. 15, 1957   F. CAMPOS   2,777,560
TABULATING MECHANISM FOR CALCULATING MACHINES
Filed Feb. 19, 1951   14 Sheets-Sheet 14

Inventor.
Francisco Campos
By Allen + Allen
Attorneys

United States Patent Office 2,777,560
Patented Jan. 15, 1957

2,777,560

TABULATING MECHANISM FOR CALCULATING MACHINES

Francisco Campos, Paris, France, assignor to Societe Anonyme dite: Societe des Brevets Logabax Application February 19, 1951, Serial No. 211,597

Claims priority, application France February 12, 1951

5 Claims. (Cl. 197—177)

The increasing complexity of economic problems in administrative work requires the use of highly improved calculating machines in order to accomplish statistics, accounting operations and the like.

The present invention concerns an improvement in mechanical elements in calculating machines presenting a great number of totalisers which are designed for accounting and statistical analysis and according to the machine described in U. S. Patent No. 2,562,172, dated July 31, 1951. This machine is essentially characterized in that it comprises a certain number of counting units respectively representing an "account" or "entry," each of which is formed of a linkage composed of rods or slides which are shiftable in a longitudinal direciton and are provided, lengthwise, with catches or teeth, the number of which equals the number of units, less one, of the adopted basis of numeration and which materialize the calculating elements, each linkage bearing such rods or slides in a number equal to the number of numeration orders foreseen for the calcuiations to be accomplished; mechanical means cooperating with the catches or teeth of said rods or slides, in order that one or more determined counting units may automatically impart to the rods or slides, under the action of an electrical or any other motor and under the control of a keyboard comprising groups of keys corresponding to the various counting units and groups of calculating keys, frontward or backward movements proportional to the numbers represented by the calculating keys which are acted upon by the operator; and mechanical means in connection with said rods or slides in order that the recording or printing of the data of the operations and their results be insured.

In such machines, the control of tabulations in both direcitons is performed in various known ways and generally by means of the accumulated force in a clock spring. This evidently provides some automatic features in the tabulating control.

On the contrary, the present machine provides an imperative control device for tabulating in both directions by means of an electric motor controlled by a clutching and unclutching device substantially comprising a plate fast with a frame and provided with a shaft around which rotates a pinion driven by two toothed wheels cooperating in a reverse direction one with the other, mounted on sockets fast with said plate and each provided with two triggers rotatively arranged in notches provided in the body of said wheels perpendicularly to their plane of rotation, a second plate connected through struts to the first plate, two ratchets cooperating with the wheel driving the tabulating bar, two shafts sliding inside said sockets and provided with washers entering grooves provided at the end of the triggers and the sliding position of which enables the triggers to cooperate with the corresponding ratchet, a third plate connected to the second plate through struts and provided with horizontal bearings in which may rock a shaft and a double arm forming a rocking device fast with said shaft and provided with studs entering the grooves of pulleys fast with said shafts, in order that the various positions of said member forming a rocking device, shall determine the direction of rotation of the wheel driving the displacement of the carrier.

Said rocking member is maintained in its position by means of rollers arranged in conical holes provided in the plate which corresponds to it. The length of the noses of the triggers may be calculated in order that, except for the two extreme positions, none of the triggers may cooperate with any of the ratchets for an oblique position of said rocking member thus allowing both toothed wheels to be driven, without this driving being communicated to the wheel driving the carrier. The plate provided with horizontal bearings at the height of which oscillates the member in the form of a rocking device is fast with a plate on which are arranged two locks capable, on the one hand, of sliding lengthwise and, on the other, of slightly shifting around two shafts fast with a plate connected by means of struts to a cover on the inside face of which are rotatively arranged two levers, one rounded end of which enters a groove provided in said locks, whereas two other levers, rotatively arranged on said plate, also exert a pressure on said locks in order to provide a guide for the locks in their lengthwise movmeent.

In case the amplitude of the movement of the rocking member is too great and in order to avoid a reclutching of the carrier, after an unclutching action, levers are rotatively arranged on the plate fast with said cover and provided at their ends with weights to damp the rocking movement due to too fast an unclutching action.

An embodiment of a machine according to the invention and the operation thereof are described more in detail hereinafter, reference being made to the appended drawings which give a diagrammatical illustration of a machine according to the invention and in which:

Figs. 1 and 1a are a general view of the machine represented by a lateral section on the line I—I of Fig. 20, and divided for clear disclosure;

Fig. 3 is a partial lateral view representing the driving members which relate to the engagement of the counting units, on the line III of Fig. 20;

Fig. 4 is a lateral section on the line IV—IV of Fig. 20 and showing the selecting members of the counting units and of the functions;

Fig. 5 is a partial horizontal section representing the rectilinear counting units of the machine on the line V of Fig. 2;

Fig. 6 is a lateral view on the line VI of Fig. 20 showing the clutching members relating to the engagement of the counting units;

Fig. 7 is a partial horizontal section on the line VII of Fig. 2 showing the driving members of the slides and of the transfer of tens;

Fig. 8 is a partial horizontal section along the line VIII of Fig. 2 and showing the disposition of the stop bars;

Fig. 12 shows a front section of a row of the keyboard;

Fig. 13 is a detailed lateral view of a key;

Fig. 14 is a horizontal section of the driving mechanism of the carrier, on the line XIV of Fig. 16;

Fig. 15 is a view of the drive of the carrier on the line XV of Fig. 1;

Fig. 16 is a side view of the drive of the carrier;

Fig. 17 is a plan view of the drive of the carrier, the cover having been removed;

Fig. 18 is a view of the drive of the carrier on the line XVIII of Fig. 16;

Fig. 19 is a diagrammatic schematic table showing the seven phases in which are grouped all the functions of the machine as described;

Fig. 20 is a partial section on the line XX of Fig. 4 showing the selecting members of the counting units and functions;

Fig. 21 is a view from the rear and an elevational view of a row of the keyboard;

Figure 1:
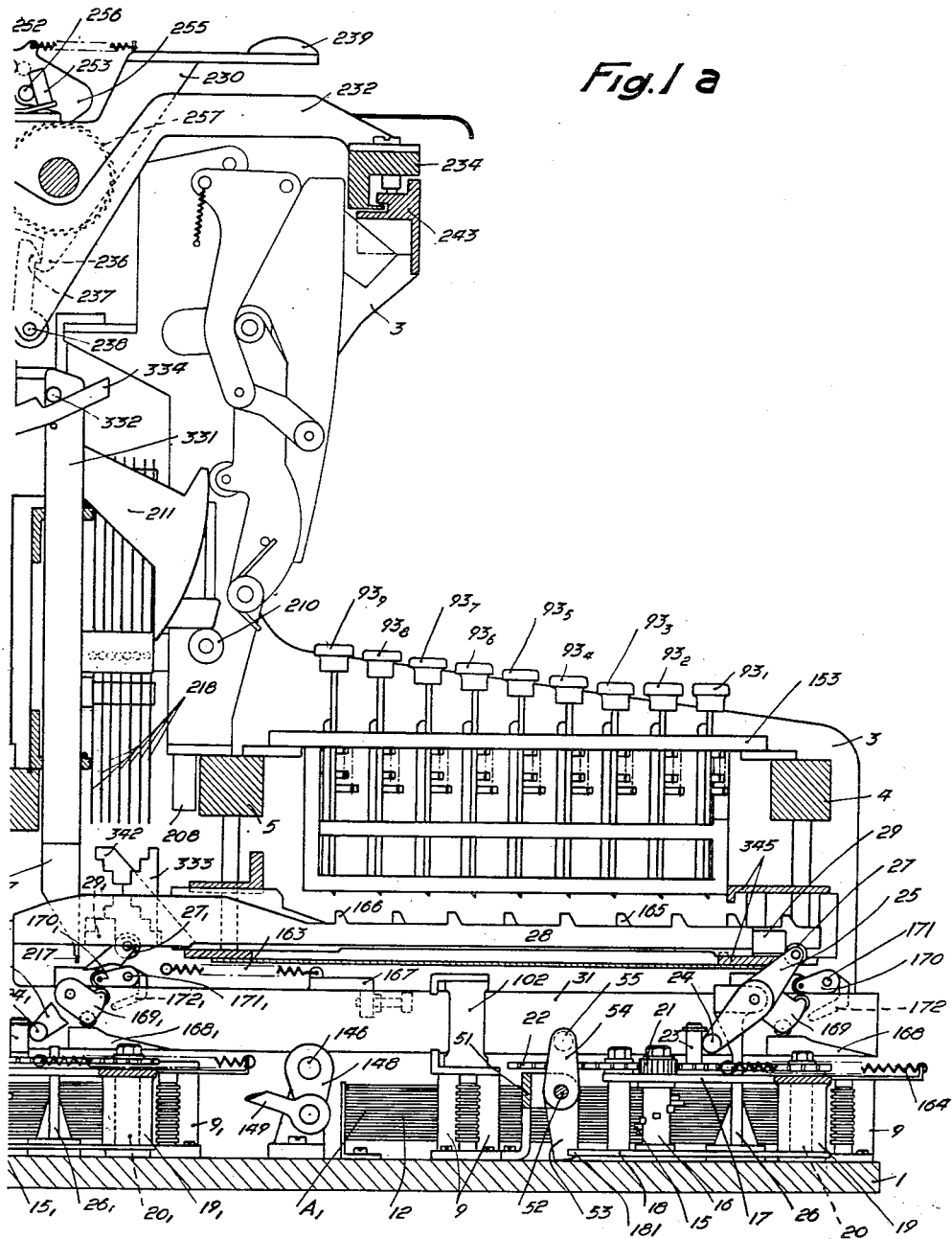

The machine as shown comprises a frame formed of a bottom plate 1 fast with two right and left flanges 2 and 3, connected by square struts 4, 5, 6 and 7, and an intermediary flange 8 maintained by said square struts 6 and 7. On said frame are fixed all the mechanical elements of the machine, which are hereafter described.

The machine comprises (Figs. 1, 1a and 5) two counting sections $A_1$ and $A_2$, each including a certain number of counting units, said sections being hereafter called "front section" and "rear section" for sake of simplicity.

On plate 1 are secured cross-bars 9 and $9_1$ (Figs. 1, 1a and 2) provided with slots for bars 10 and $10_1$ (Fig. 5) which are provided with studs 11 and $11_1$, such as described in my above mentioned U. S. Patent 2,562,172. Said studs 11 and $11_1$ act as guides for slides 12. Triangles 13 and $13_1$ are guided by means of another group of cross-bars 9 and $9_1$, arranged so as to cooperate with other studs 14, also provided on bars 10 and $10_1$, and which may thus easily be shifted longitudinally.

Springs 64 and $64_1$ maintain bars 10 and $10_1$ by pressing upon them (Fig. 5) so as to lock slides 12 by means of locking angle-bars 65 and $65_1$. Said locking action continues as long as the corresponding counting unit has not been selected.

Two shafts 16 and $16_1$ are mounted in upper plates 17 and $17_1$ and lower plates 18 and $18_1$ which are held parallel by means of sleeves 19 and $19_1$ (Figs. 1, 1a and 4).

The unit thus constituted may rock around trunnions 20 and $20_1$ (Figs. 1 and 1a) fixed on plate 1.

Pinions 21 and $21_1$ are fixed on shafts 16 and $16_1$ (Fig. 20) and cooperate with racks 22 and $22_1$ mounted on the upper bearings 17 and $17_1$, in order to drive a longitudinal slide. These racks are permanently drawn towards the front of the machine by springs 164 and $164_1$, the other ends of which are fixed on the bearings 17 and $17_1$ (Figs. 1 1a, 4 and 20).

Racks 22 and $22_1$ slidably mounted above the bearings 17 and $17_1$, are provided with rollers 23 and $23_1$ which cooperate with finger rollers 24 and $24_1$, fast with lever-arms 25 and $25_1$ (Figs. 1 and 1a) and rotatively mounted on two supports 26 and $26_1$ fast with plate 1; the upper arms of said levers 25 and $25_1$ are provided with rollers 27 and $27_1$; stop bars 28 and $28_1$ are provided with salients 29 and $29_1$ cooperating with rollers 27 and $27_1$. Said stop bars 28 and $28_1$ slide in grooves provided inside a frame 345 fixed to the struts 4 and 5, and said bars, which are acted upon by springs 164 and $164_1$, are maintained in position towards the front of the machine by a cross-bar 30 (Figs. 1 and 1a) fixed at both its ends to two parallel bars 31 and $31_1$, respectively sliding on the left and right hand flanges of the machine. Bars 31 and $31_1$ acted upon by springs 163 are maintained towards the front of the machine by rollers 32 and $32_1$ and levers 33 and $33_1$ (Figs. 1, 1a, 2 and 2a). Said levers 33 and $31_1$ are fast with a shaft 34, one arm 35 of which is driven by a rod 35, a lever 37 and a cam 38. Cam 38 is fast with a shaft 39 rotated by the motor M of the machine, by means of well known self clutching and unclutching system E, such as, for example, that described in my above mentioned U. S. Patent No. 2,562,172, and visible in Fig. 2. Lever 37 is rotatively mounted on a shaft 40, the ends of which are fixed to flanges 2 and to the intermediary flange 8 (Figs. 1 and 1a). Shaft 39 is also rotatively mounted on said flanges 2 and 8.

Sliding bars 31 and $31_1$, in addition to the cross-bar 30 hereabove mentioned, are provided with angle bars 167 and $167_1$ carrying springs stops 66 and $66_1$, one for each numeration order, the functions of said stops being hereafter explained.

Bars 31 are provided with slopes 168 and $168_1$ (Figs. 1 and 1a) forming a salient on said bars 31. These slopes rise during the return movement of the bars 31 from the front towards the back of the machine.

Said bars 31 are furthermore provided with levers 169 and $169_1$ which control the rocking of levers 170 and $170_1$ which are respectively fast with shafts 171 and $171_1$, which travel across the whole width of the machine and are provided with fingers 172 and $172_1$ (Figs. 9 and 11), the operation of which is hereafter explained.

Figure 2:
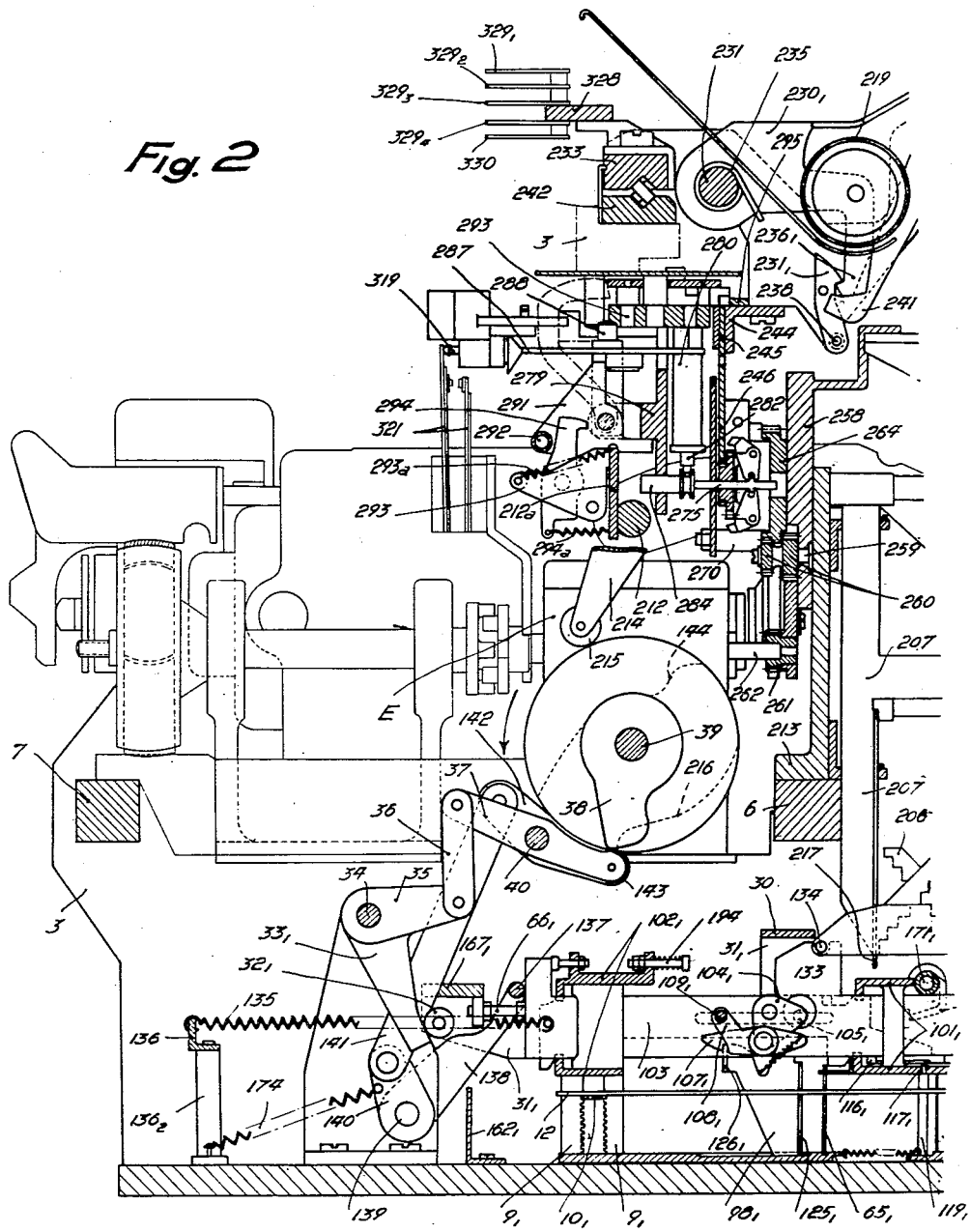
Figs. 2 and 2a are a general view of the machine represented by a section parallel to that of Figure 1, but in a plane passing through the middle of the machine, and similarly divided.
Figure 2A:
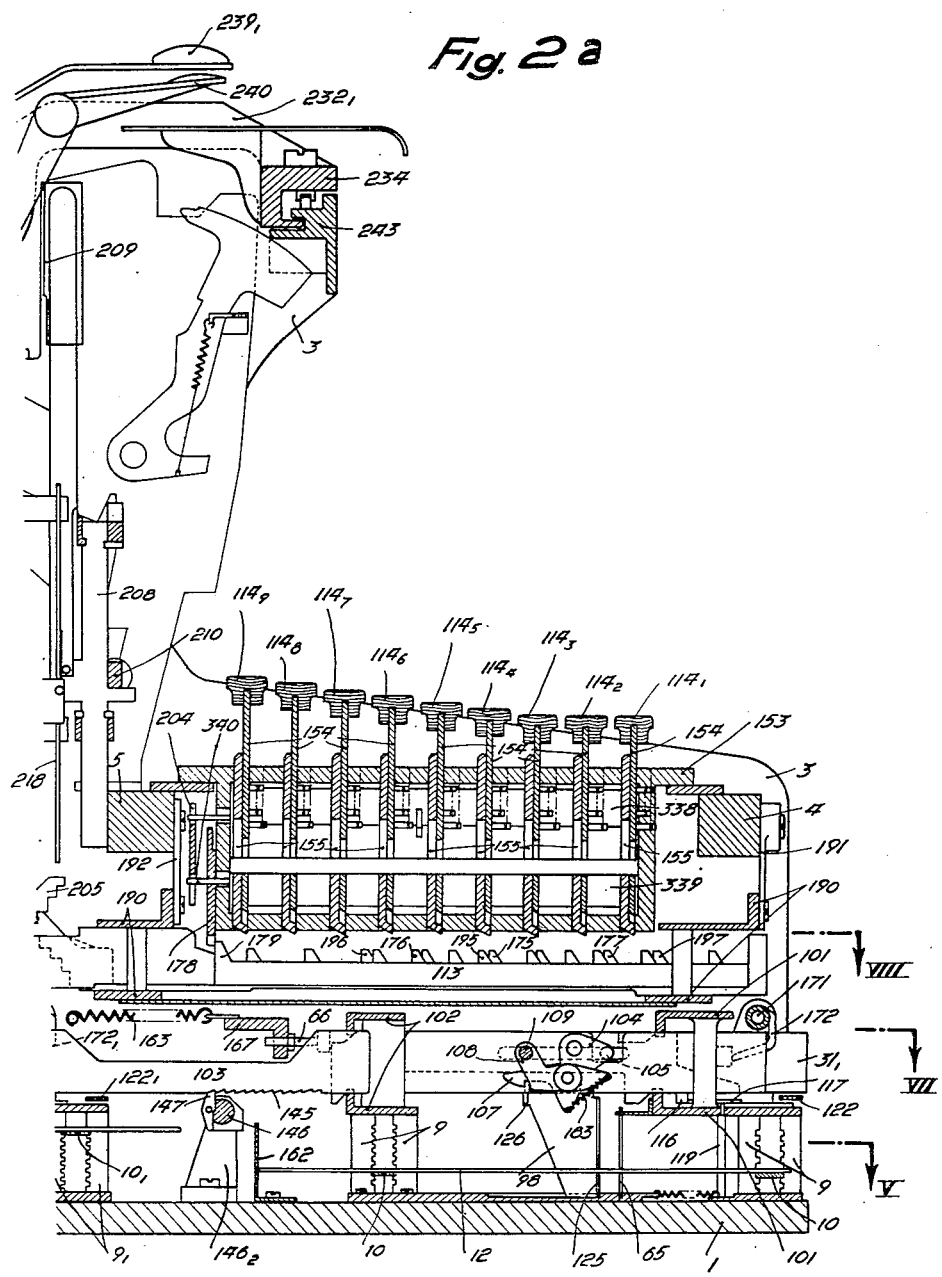
Figure 10:
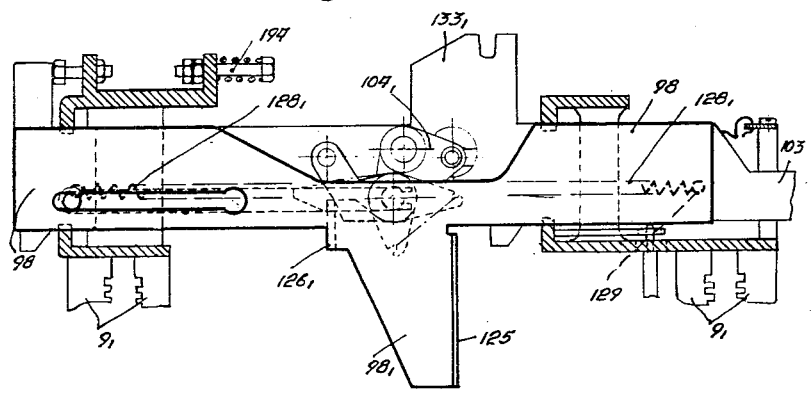
Fig. 10 is an illustration of the details of a mobile angle member.

Levers 169 and $169_1$ and shafts 171 and $171_1$ are rotively mounted around bearings fixed on plate-shaped guides 101 and $101_1$, 102 and $102_1$ (Figs. 2 and 2a). On an extension of plates 17 and $17_1$ are mounted rollers 41 and $41_1$ on the axle of which are hooked springs 42 and $42_1$ fixed, at their other ends, on slides 43 and $43_1$, in order to maintain rollers 41 and $41_1$ in contact with bent arms 44 and $44_1$ fast with slides 43 and $43_1$ (Fig. 20). Said slides 43 and $43_1$ are slidably mounted on bar 45, which is also slidably mounted on flange 2. Springs 46 and $46_1$ are hooked at one of their ends on flanges 2 and at their other ends to slides 43 and $43_1$. A lever 48 maintains bar 45 rearwards, said bar acting against springs 46 and $46_1$ by means of a roller 47 fixed onto said bar 45. Lever 48 (Fig. 3) is rotatively mounted on shaft 40 and provided with a roller 49 driven by a cam fast with shaft 39. Shafts 52 and $52_1$ are rotatively mounted on supports 51 and $51_1$ and are provided with arms 53 and $53_1$ which are for the purpose of locking the lower plates 18 and $18_1$ in one direction or in the other by acting on the noses 180 and $180_1$ of said bearings, either when said bearings 18 and $18_1$ are under the action of springs 46 and $46_1$ or when said bearings 18 and $18_1$ are under the action of springs 42 and $42_1$ (Figs. 1, 1a, 3, 4, and 20), according to the position of cam 50 which determines whether or not lever 48 will displace bar 45 submitted to the action of springs 46 and $46_1$. Shafts 52 and $52_1$ are moreover fast with arms 54 and $54_1$, carrying rollers 55 and $55_1$ arranged for cooperation with sliding-bars 56, 57, 68, 69 (Figs. 10, 4 and 6) mounted on guides 57 and $57_1$ solid with plate 1.

Bar 56 is maintained in its position towards the rear of the machine by means of a stop 59 driven by a spring 58 and said bar 56 tends to slide towards the front of the machine under the effort of a roller 60 carried by a lever 61 rotatively mounted on shaft 40 and having an upper arm 62 provided with a nose capable of cooperating alternatively with teeth $63_1$ and $63_2$ of a cam 63 fast with shaft 39 (Fig. 6).

Bars 61, 68, 69 also slide on guides 67 and $67_1$ and are drawn rearwards by means of springs 70, 71 and 72. Bars 67 and 68 are each provided, at one of their ends, with two shiftable levers 73, 74 and $73_1$, $74_1$ (Figs. 6 and 4) whereas bar 69 is provided with only one shiftable lever 75. All these levers are pulled upwards by means of springs 76. These different levers are of an identical shape, except for levers 74 and $74_1$ which extend in an upper arm 77. Lever 78 (Fig. 4) is rotatively mounted on shaft 40 and is provided with a roller 79 which cooperates with a cam 80 fast with shaft 39. A plate 81 is rigidly connected to the lower arm of lever 78 and the dimensions of this plate are so chosen as to allow it, by means of a spring 168, to press at the same time upon all levers 73, 73₁, 74, 74₁ and 75 (Fig. 20) said levers being otherwise under the action of spring 76.

A sliding plate 82 (Figs. 4 and 20) is capable of sliding along a guide 83 and is under the action of a spring 84 which causes the sliding plate to be pulled towards the right hand side of the machine.

A groove 85 is provided in plate 82 in order that only one nose 86 of one of the levers 73 to 75 may pass through plate 82, according to the sliding position of said plate. On the same guide 83 is rotatively mounted a lever 87 provided with a roller 88 entering a suitable groove provided in plate 82. The other arm of said lever 87 is provided with a second roller 89 which cooperates with the extension 90 of stop bar 91 (Figs. 4 and 8).

Said stop bar 91 cooperates, in the manner described in my above mentioned U. S. Patent No. 2,562,172, with a group of keys 92₁ to 92₆; stop bars 28 and 28₁ (Fig. 8) also respectively cooperate with two other groups of keys, 93₁ to 93₉ (Figs. 1 and 1a). The above described members are the control members for selecting the counters of each section and the selection of functions will be described hereinafter with more details by the explanation of their operation as follows:

The operator depresses one of keys 93₁ to 93₉ (Figs. 1 and 1a) and the counting unit of the corresponding section bearing the number of the key will be caused to operate, when the motor is started, shaft 39 being driven by the self clutching and unclutching device.

In considering Figure 3, it may be seen that cam 50, fast with shaft 39, will exert a pressure upon roller 49, thus causing lever 48 to rock, which lever will, in turn, exert a pressure upon roller 47, causing bar 45 to slide towards the rear of the machine, said bar being under the action of springs 46 and 46₁, on the one hand, and springs 42 and 42₁ on the other.

Supports 17 and 17₁ will be prevented from rocking, since the other parallel supports 18 and 18₁ (Figs. 1, 1a and 4) are locked by locking members 53 and 53₁.

At the same time, cam 38 (Figs. 2 and 2a) will release lever 37, which allows the movement of rod 36, lever 35 mounted on shaft 34 and levers 33 and 33₁, whereby bars 31 and 31₁ will slide towards the rear of the machine, under the action of springs 163.

Cross-bar 30 will also move backwards, this movement also affecting stop bars 28 and 28₁ by virtue of levers 25 and 25₁ exerting a pressure upon salients 29 and 29₁ provided on said bars 28 and 28₁ (Figs. 1 and 1a).

Stop bars 28 and 28₁ are thus under the action of springs 164 and 164₁, said springs 164 and 164₁ pulling upon racks 22 and 22₁ (Figs. 8 and 20) by means of rollers 23 and 23₁ cooperating with rollers 24 and 24₁, provided on levers 25 and 25₁. It is possible, though, to stop these movements, by means of whichever key 93₁ to 93₉ has been depressed.

Racks 22 and 22₁ permanently cooperate with pinions 21 and 21₁ in order that the rotation value of the pinion be proportional to the position, on the key-board, of keys 93₁ to 93₉ which may be depressed by the operator.

As described hereabove, pinions 21 and 21₁ are fast with shafts 16, 16₁ carrying fingers 15 and 15₁.

The fingers are helically arranged on the shafts, so that each finger may be opposite the triangle 13 which belongs to the counting unit, the numeration order of which corresponds to that of the key depressed by the operator.

The preparation for selecting the counting units is thus operated. The unlocking of slides 12 corresponding to said counting units, as well as their engagement with driving and calculating means, will now be described:

When shaft 39 continues its rotation (Fig. 6), cam 63 is rotated and the tooth 63₁ is engaged under the nose of lever arm 62, driving lever arm 61 which, through roller 60 causes bar 56 to slide towards the front of the machine, said bar 56 being at the same time under the action of spring 58.

Bar 56 will simultaneously exert a pressure upon rollers 55 and 55₁, thus unlocking plates 18 and 18₁ through rotation of levers 53, 53₁ (Figs. 1, 1a and 4). At this moment, the unit composed of plates 17 and 17₁, 18 and 18₁, and shafts 16 and 16₁ provided with fingers 15 and 15₁, will rock under the action of springs 42 and 42₁ (Fig. 3) and fingers 15 and 15₁ which are opposite triangles 13 and 13₁ (Fig. 5) corresponding to the selected account, will exert a pressure on said triangles.

Bars 10 and 10₁ will slide, against the action of springs 64 and 64₁, thus releasing slides 12 from the locking bars 65 and 65₁ and engaging said slides 12 with driving and calculating means 98 and 98₁ (Figs. 5 and 2 and 2a) hereafter described.

Figure 11:
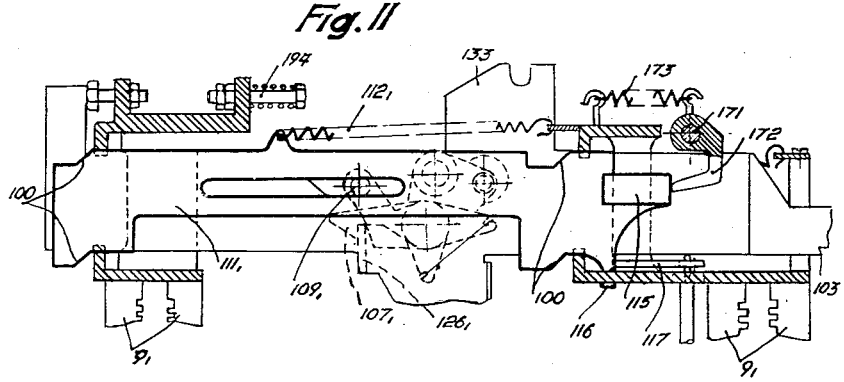
Fig. 11 is an illustration of the details of a clutching bar.
Figure 22:
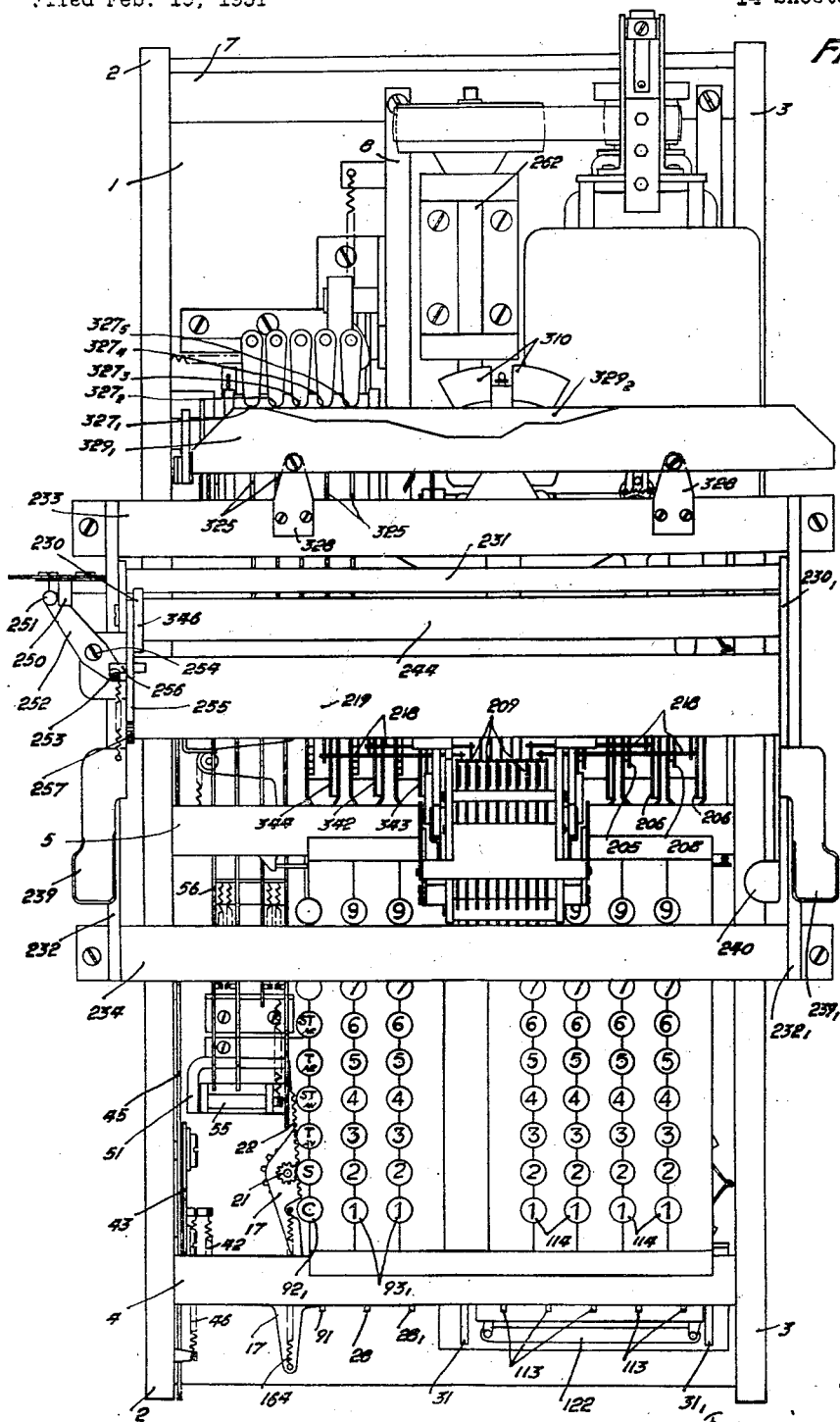
Fig. 22 is a plan view from above of the whole of the machine, the cover and the carrier being removed.

Cross bars 9 and 9₁ are provided with guides 101, 102 and 101₁, 102₁, inside which are slidably mounted driving bars 103 (Figs. 2 and 2a). On said bars 103 are rotatively mounted triangular levers 104 and 104₁ (Figs. 1, 1a, 7 and 10) provided at the end of their horizontal arms with studs 105 and 105₁, arranged for passing through an opening provided in the driving bar 103 and to engage in grooves provided in the transfer bars 106 and 106₁ (Figs. 7 and 9) pertaining to the immediately inferior numeration order. Said transfer bars 106 and 106₁ may slide along guides 101 and 102 and are provided with slopes 100, arranged at an appropriate angle, for instance of 45° and which determine a parallel upward movement of the groove, when said bars are under the action of springs 110 and 110₁. On the end of the vertical arm of the triangular levers 104 and 104₁ are rotatably mounted ratchets 107 and 107₁ and counter ratchets 108 and 108₁. The counter ratchets 108 and 108₁ (Figs. 2 and 2a) are provided with studs 109, 109₁ entering grooves of the unratching bars 111 and 111₁ (Fig. 11). These unratching bars are provided with slopes 100 identical to those of bars 106 and 106₁ hereabove mentioned, in order to determine a parallel upward movement of said grooves when the unratching bars 111 and 111₁ are under the action of springs 112 and 112₁.

It should be noted that the amplitude of the upward movement of the grooves provided in the slopes 106 and 106₁ and 111 and 111₁ is equal to the pitch of stop bars 113 determined by the spacing of keys 114 and the spacing of the teeth of said stop bars 113, said pitch being also equal to that of the pitch of the slots arranged in slides 12 (Figs. 2 and 2a). All unratching bars 111 and 111₁ are provided with a salient 115 cooperating with transfer bars 106—106₁ also cooperating with a foot 116 capable of engaging with the nose of a stop-member 117 in order that said stop member 117 may lock the unratching bars 111 and 111₁, thus locking at the same time the transfer bars 106 and 106₁, under the action of two springs 110 and 110₁ and 112 and 112₁. Stop members 117 are rotatively mounted on guides 101 and 101₁ and are provided with a groove in which there engages a stud 118 arranged on a disengaging shaft 119 (Figs. 2, 2a, 5 and 7); this disengaging shaft 119 is mounted, on the one hand, on frame 1, and on the other on guiding plates 101 and 101₁, so that bearings 120 of slides 12 (Fig. 5) causes it to shift when said slides 12 reach their extreme position towards the front of the machine. Stop member 117 at the extreme right, as well as stop member 117 at the extreme left are provided with supplementary arms 121 and 121₁, connected together by a rod 122 (Fig. 7).

Transfer bars 106 and 106₁ on the extreme right are not provided with unratching bars but are provided with a nose 123 the movement of which is limited by stop member 117 on the extreme right. Consequently, when a slide 12 belonging to the highest numeration shaft (on the left) causes the disengaging shaft 119 to shift in reaching its most forward position, unratching bars 111 and 111₁ of said shaft and transfer bar 106 and 106₁ of the lowest shaft (on the right) are under the action of springs 112 and 112₁, and 110 and 110₁ because of the simultaneous shifting of the extreme stop members 117, which normally maintain them locked.

In guides 101, 102, 101₁ and 102₁, slide mobile angle members 98 and 98₁ (Figs. 2, 2a, 5, 7 and 10), a bent edge 125 of which cooperates with slots provided on the right side of slides 12 when said slides are displaced from left to right under the action of the selecting and engagement members hereabove mentioned. Said mobile angle members 98 and 98₁ are also provided with ratching fingers 126 and 126₁ cooperating with ratchets 107, 107₁ and counter ratchets 108 and 108₁ and also with stops 127, 127₁, the operation of which will be explained hereafter.

Springs 128 and 128₁ are fixed, on the one hand, to mobile angle members 98, 98₁ by a hook 129, and, on the other, to the end of a rod 130 which is rotatively mounted on shaft 131 of the ratchets and counter-ratchets 107 and 107₁, 108 and 108₁. Said rod is guided by a stud 132, entering a groove arranged in the mobile angle members 98, 98₁ (Fig. 7). Rod 130 has for its only function to allow ends of springs 128 and 128₁ to remain apart from one another, in order that they should have a correct length.

Driving bars 103 which are to be seen in Figures 2 and 2a, are provided with a salient 133, provided with a groove in which shaft 134 of stop bars 113 is engaged and said driving bars 103 are permanently maintained rearwards under the action of springs 135, one end of which is hooked to a cross-bar 136 fast with a support 136₂ which is fast with plate 1. A cross-shaft 137 is mounted on levers 138 fast with shaft 139 and is capable of rotating in bearings fixed to plate 1. A lever 140 is fast with shaft 139 and is connected through a rod 141 to a lever 142. The lever 142 may also rotate around shaft 40 and is provided at its end with an anti-friction roller 143. Said roller 143 will or will not be under the action of cam 144 according to the rotation of shaft 39 driving said cam 144. If said roller 143 cooperates with cam 144, the whole of the driving bars 103 is brought back to its normal position, i. e. to its resting position towards the front of the machine, but if, on the contrary, roller 143 and consequently, rod 141 are not under the action of cam 144 driven by shaft 39, said bars 103 will be directly under the action of springs 135. Said driving bars 103 are provided with saw teeth 145 and a play compensating shaft 146 is rotatively mounted in supports 146₂ solid with plate 1. On this shaft are rotatively mounted ratchets 147, one for each numeration order.

A lever 148 is solid with shaft 146 and said lever 148 (Figs. 1 and 1a) is connected through a rod 149 to a lever 150 rotatively mounted on shaft 40. Said lever 150 is provided with roller 151 which cooperates or not with cam 152 which follows the rotating movement of shaft 39. If roller 151, and therefore lever 150 cooperate with cam 152, ratchets 147 will determine the correct position of driving bars 103, which are acted upon, on another hand, by springs 135.

Nine keys 114 (Figs. 2 and 2a) indicated by reference numerals 114₁, 114₂, 114₃, 114₄, 114₅, 114₆, 114₇, 114₈, 114₉ are mounted on the upper part of rods 154 sliding inside of frames 53, one frame being provided for each numeration order (Figs. 2, 2a, 12, 13 and 21). Thus, it may be seen that rods 155 are mounted parallel to rods 154 and are provided with a stud 156, said stud passing through a slot and serving as a hooking point for a spring 157 hooked, at its other end, upon another stud 158 fast with rods 154. A spring 159 is hooked, at one of its ends, on to frame 153 and, at its other end, on to a stud 160, which is also fast with rod 154.

When the operator depresses a key 114, rod 154 fast with said key follows the downward movement and spring 157 will also drive rod 155 downwards, which in travelling downwards, will act as a stop for the teeth of stop bar 113 (Figs. 2 and 2a), when said stop bars 113 are under action of springs 135. While the machine operates its cycle, and during the rotation of shaft 39 and before stop bars have returned to their extreme position towards the front of the machine, the operator may depress another key. Nothing will prevent said stop bars 113 from returning, since the teeth of corresponding stop bar 113, which must pass under the previously depressed rod 155, will act upon said rod by means of bevel 161 of rod 155 under the action of spring 157.

As soon as the tooth has gone by and stop bars 113 are driven by cross-bar 137 to their extreme position, rods 155 will come down again and will therefore again be ready to play their normal part of a stop for the next operation.

On the vertical sides of the key board frames 153 are rotatively mounted flaps 336 to maintain rods 154 in a downward position in cooperation with inclined planes 337, with which rods 154 are provided. A cross-bar with large teeth 338 causes the flaps 336 to tilt after each recording in order to release all rods 154 which have been depressed by the operator. Tranverse movement of bar 338 is caused by cams and rods not represented in the drawings. Flaps 339 are mounted in the same way as flaps 336 so that when any of arms 334 is brought down, flaps 339 which correspond to said arm tilt over, thereby driving and tilting a zero finger 178 by means of stud 340 solid with said flap 339. It should be remarked that if the said zero fingers 178 are not tilted, said fingers stop all stop bars 113 by means of the zero teeth 179 (Figs. 2 and 2a) of said stop bars.

A bar 341 (Fig. 13) is fixed to the vertical sides of frame 63 and has for its object to limit upward and downward movement of rods 144.

All the members which have been hereabove described will be hereinafter further described with more detail together with other members which have not been mentioned. In order to facilitate the understanding of the following description, the operation of said members in relation to the various functions which the machine according to the present invention is to perform will also be described and concrete examples will be given.

ADDITION

Addition may be simultaneously carried on in a counting unit belonging to one section and in another counting unit belonging to the other section of the machine.

Operator depresses keys 93 corresponding to the counting unit number in which the addition is desired, as well as keys 114 for the composition of the amount to be added, thereby choosing the row which corresponds to the numeration order of each given figure. Operator then acts upon the control of the motor in order to start said motor, which determines a complete revolution of shaft 39 as well as of all cams fast with said shaft, thus originating operations which will be described hereunder.

For the sake of clearness the operator will be supposed to have depressed keys 93₄ for the front section and key 93₉ for the rear section, as well as keys 114₂, 114₇ and 114₅ respectively in the three rows on the right of the keyboard, i. e. corresponding to the units, tens and hundreds. Slides 12 belonging to the selected counting unit will also be supposed to be in the position indicated at 312 in counting unit No. 9 of rear section and at 128 in counting unit No. 4 of the front section. All other slides of the two mentioned counting units are in a position which corresponds to zero, i. e. in their extreme position towards the rear of the machine, in coincidence with stop plates 162 and 162₁ fixed on plate 1.

*Phase I*

*Selection of the function and of the counting units.—* Under the action of the motor, which has been started, shaft 39 starts its revolution, driving cam 38 (Figs. 2 and $2a$) which releases lever 37, so that bars 31 (Figs. 1 and 1$a$ and 2 and 2$a$) and their cross-bar 30, under the action of springs 163, release stop bars 91, 28 and $28_1$ (Figs. 1, 1$a$ and 4). At this moment, stop bar 91 will be driven towards the rear of the machine under the action of spring 84 (Figs. 4 and 20) and that of cooperating members 82, 87 and 90. Since operator has not depressed any function key 92, stop bar 91 (Fig. 4) will slide freely until it has reached its extreme position towards the rear of the machine and plate 82 provided with groove 85 will also slide until it has reached its extreme position towards the right hand side of the machine, covering levers 73, $73_1$, 74, $74_1$ and 75 which are thus maintained.

Simultaneously, stop bars 28 and $28_1$ (Figs. 1 and 1$a$) will tend to slide towards the rear of the machine under the action of springs 164 and $164_1$ and that of levers 25 and $25_1$.

The operator having depressed keys $93_4$ and $93_9$ of the front and rear section of the machine, displacement of the stop bar 28 will be limited by the rod of key $93_4$ cooperating with tooth 165, while the rod of key $93_9$ cooperating with tooth 166 will oppose any further movement of said stop 28 (Figs. 1 and 1$a$).

In these conditions, the disposition of the selecting members already mentioned, will bring about the cooperation of salients 29 and $29_1$, engaging rollers 27 and $27_1$ with levers 25 and $25_1$ which, by means of rollers 24 and $24_1$ drive racks 22 and $22_1$ and shafts 16 and $16_1$ and fingers 15 and $15_1$, so that, in the front section of the machine, a finger 15 will be opposite triangle 13 corresponding to counting unit No. 4, whereas in the rear section of the machine, a finger 15 will be opposite triangle 13 corresponding to counting unit No. 9.

*Releasing of mobile angle members and transfer slopes.*—As illustrated at Figures 2 and 2$a$ and according to above indications, bars 31 are provided with cross angle members 167 and $167_1$ cooperating with angle members 98 and $98_1$ provided with the ratching fingers 126 and $126_1$, which cooperate with ratchets 107 and $107_1$ as above described. At the considered moment of the cycle of the machine, the mobile angle members 98 drive the bars 31 towards the back of the machine.

Figure 9:
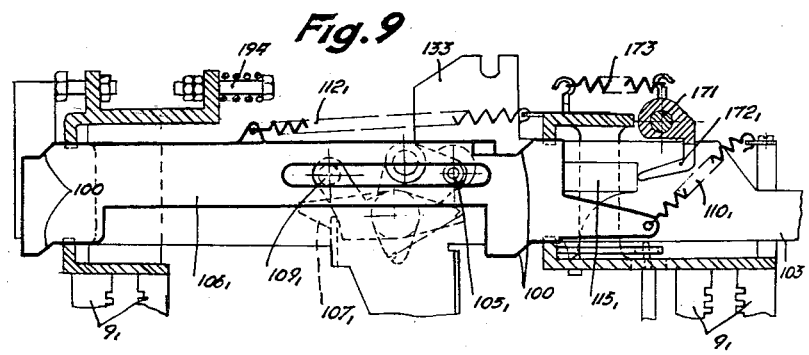
Fig. 9 is an illustration of the detail of a transfer bar.

The rearward movement of bars 31 causes a movement of slopes 168 and $168_1$ (Figs. 1 and 1$a$) which liberate levers 169, $169_1$, 170 and $170_1$ thus allowing shafts 171, $171_1$ to rotate counterclockwise, driving the rake-shaped members 172, said rotation being controlled by springs 173 and $173_1$ (Figs. 9 and 11). Each tooth of the rake-shaped members 172 and $172_1$ exerts a pressure on salient 115 or $115_1$ of a bar 111, $111_1$. It will be further explained that all bars 111 and $111_1$, as well as transfer bars 106 and $106_1$ will freely slide frontwards under the action of the respective springs 110 and $110_1$ or 112 or $112_1$, as soon as corresponding stop member 117 or $117_1$ has been withdrawn by release shaft 119.

*Preparation of the engagement.*—Together with the above-mentioned movements, the preparation of engagement of account counting units is operated in the following manner:

Cam 50 exerts a pressure on roller 49 (Fig. 3) which tilts lever 48 then cooperating with roller 47 in order to drive engagement bar 45, thus pulling springs 46 and $46_1$ as well as springs 42 and $42_1$.

Moreover, rollers 41 and $41_1$, as well as plates 17 and $17_1$, do not follow this movement, since locking members 53 and $53_1$, according to the above explanation, maintain plates 18 and $18_1$ (Figs. 1 and 1$a$), which are fast with plates 17 and $17_1$, in their locking position.

Second phase

*Function control.*—Shaft 39 continuing its rotation, cam 80 (Fig. 4) engages roller 79, thus rocking lever 78 which was maintained by spring 168.

Plate 81, in the at rest position of the machine plays the part of a stop for levers 73, 74 and 75 and should normally release said levers under the action of springs 76, but plate 82 having slid to its extreme position, groove 85 of said plate 82 passes beyond the vertical plane of lever 75 and none of levers 73, 74 and 75 will rise.

Consequently, plate 81 will pass over nose 185 of levers 73, 74 and 75 without driving any of said levers.

*Releasing of the corrector.*—Simultaneously, cam 152 (Figs. 1 and 1$a$) releases roller 151, thus causing levers 150 and 148 to rock, said levers being connected through rod 149 and being under the action of springs 335. Shaft 146 will follow this rocking and teeth 145 will cease to cooperate with the ratchets 147, cooperating with said shaft 146.

Third phase

*Positioning of adding sections.*—Shaft 39 continuing its rotation, cam 144 (Figs. 2 and 2$a$) releases lever 142, which drives rod 141, said rod 141 releases lever 140 and allows shaft 139 to rotate under the action of spring 174. Cross shaft 137 which, up to now, maintained driving bars 103, will revert backwards and its rearward movement will not be limited by angle-bar 167 since, according to the above description of Phase 1, said angle-bar already was in a rear position at the moment of the cycle described at Phase 1. At this moment of operation of the machine, all driving bars 103 are released and are ready to slide rearwards under the action of springs 135 and according to the disposition of keys 114 which have been depressed by the operator.

In the above example, the operator is supposed to have depressed key $114_5$ in the row at the extreme right, i. e. that of the units, key $114_7$ in the immediate prior row corresponding to the tens and $114_2$ in the next row, or row of hundreds; consequently, the first key rod of the units will stop the corresponding stop bar, as may be seen in Figures 2 and 2$a$, through engagement of tooth 175, which progresses rearwards a value equal to five pitches. The second key rod, that of the tens, will stop the corresponding stop bar through tooth 176, which progresses seven pitches and the third key rod, that of the hundreds, will stop corresponding stop bar 177, which progresses two pitches. None of the other stop bars will meanwhile have been able to progress, since zero fingers 178 stop said stop bars by cooperating with teeth 179 of said fingers, if no rod has been depressed in the rows to which they correspond. Driving bars 103 are provided, as hereabove described, with a salient 133 which cooperates with shaft 134 on which are mounted stop bars 28, so that the rearward progression of driving bars 103 is determined by means of the stop bars, as has been described.

Fourth phase

*Action of the corrector.*—Rotation of shaft 39 continuing (Figs. 1 and 1$a$), cam 152 cooperates with roller 151 and under the effort of its pressure, causes lever 150 to rock, which lever drives rod 149 which will, in turn, cause lever 148 to rock. Shaft 146, on which lever 148 is mounted, rotates clockwise and ratchets 147, which may better be seen in Figures 2 and 2$a$ cooperating with said shaft, as hereabove described, insure, while at the same time correcting, the positioning of driving bars 103, said positioning depending upon the prior phase and also upon which of the keys of the keyboard have been depressed.

*Engagement of the counting unit.*—In considering Fig. 6, it may be seen that, immediately after the beginning of this fourth phase, tooth $63_1$ of cam 63 cooperates with the nose of arm 62 of engagement lever 61, thus causing said lever to rock, which, in its turn, causes bar 56 to slide frontwards. Said bar 56 exerting its weight both on rollers 55 and $55_1$, causes the unit composed of levers 54 and $54_1$, shafts 52 and $52_1$, and locking devices 53 and $53_1$, to rock (Figs. 1, 1$a$ and 4).

In considering now Figure 3, it may be seen that it is at this instant that springs 42 and 42₁ cause both plates 17 and 17₁ to rock, as well as plates 18 and 18₁, said plates being accompanied by the shafts 16 provided with fingers 15. Fingers 15 (Fig. 20) corresponding to counting unit No. 4 in the front section and to counting unit No. 9 in the rear section, will cooperate with noses 180 and 180₁ of triangles 13 and 13₁, respectively. As hereabove described, said triangles 13 and 13₁ will cooperate, at this moment, and only at this moment, with bars 10 and 10₁, exerting on said bars a pushing movement which will result in disengaging all slides corresponding to counting units No. 4 and No. 9 from locking angle-bars 98 and 98₁ (said angle-bars being better visible in Figs. 2, 2a and 5). It should be remarked that the locking device 53 and 53₁ will lock in an opposite direction, i. e. in the engagement position of noses 181 and 181₁ of plates 18 and 18₁.

*Fifth phase*

*Preparation of the disengagement.*—Considering now Figure 3, after the end of the fourth phase, shaft 39 continues to rotate, cam 50 releases roller 49, and, by means of the same connections as hereabove described bar 45 will be unlocked while slides 43 and 43₁ will continue to exert a pressure, under the action of springs 46 and 46₁, upon rollers 41 and 41₁. However said pressure will not cause the unit, composed of bearings 17 and 17₁, 18 and 18₁ to rock, since, as in the fourth phase, the locking devices 53 and 53₁, visible in Fig. 1, will lock noses 180 and 180₁ of bearings 18 and 18₁.

*Resetting of adding sections and disengagement of functions.*—Meanwhile, cam 144 (Figs. 2 and 2a) has reached a position which causes it to drive levers 142 and 140, connected by rod 141. Horizontal shaft 137 will bring back, frontwards, to their original position, all driving bars which have been displaced rearwards. All said bars will therefore have a return movement, the value of which will be exactly that of the movement executed under the action of springs 135 during Phase 3. This return movement, according to the above description, takes place while slides 12 cooperate with mobile angle members 98 and 98₁ and according to the engaging functions as described in Phase 3.

Meanwhile, as above described, driving bars 103 cooperate with mobile angle members 98 and 98₁ by means of the transfer members, i. e. the rockable levers 104 and 104₁. Said levers are maintained in their normal axial position by studs 105 and 105₁ entering into horizontal grooves arranged in transfer bars 106 and 106₁, and cooperate with ratchets 107 and 107₁ and counter-ratchets 108 and 108₁. Counter-ratchets 108 and 108₁ are maintained in their normal position by means of studs 109 and 109₁ entering into the grooves of the unratching bars 111 and 111₁ and ratchets 107 and 107₁ are maintained in their ratching position through springs 183 and 183₁. This explains the reason why slides 12 will follow the return movement of driving bars 103. Reverting to the above example, the extreme right hand side slide of the counting unit No. 9, or units slide, belonging to the rear section, and which was in position "2" will pass on to position "7." The immediately next slide or tens slide, which was in position "1" will pass on to position "8" and the following slide or hundreds slide, which was in position "3," will pass on to position "5."

Slides 12 of counting unit No. 9, belonging to the rear section, have thus operated the following addition: 312+275=587.

It may however happen that the hereabove described return movements cause advancements of slides 12 which are greater than the complement to 9 of the position (in number of pitches) which they occupied at the moment of their engagement with levers 104 and 104₁. In such a case, the devices provided for the transfer will operate in the following manner: if the above example is once more considered, the extreme right hand side slide or units slide of counting unit No. 4, belonging to the front section, was in position "8" and the return movement involved by drive bar has a value of five pitches.

Consequently, notch 120 of said slide (Figs. 5 and 7) will have caused the rocking of disengaging shaft 119, which corresponds to the units, after a shifting of two pitches, so that stud 118, fast with said shaft will have caused stop member 117 to rock and that unratching bar 111 (Fig. 11) corresponding to the extreme right order or units order, will no longer be stopped, either by stop member 117 which has rocked, nor by rake-shaped member 172 which has already been withdrawn during the first phase. Consequently, spring 112 will pull the unratching bar 111 and cause it to slide frontwards. Said unratching bar 111 being provided with a sloped section edge, such as above described, will drive counter-ratchets 108 through its horizontal groove which will rise, as well as ratchet 107, and will at the same time release mobile angle member 98. As soon as mobile angle member 98 is released, spring 128 (Fig. 7) acts upon said mobile angle member 98 rearwards until edge 127 of said angle member bears against the middle of counter-ratchet 108. As has been described, the position of said edge 127 is such that the value of the rear movement is exactly equal to ten pitches, the consequence of which will be that the slide will be driven to its extreme rearward position. Meanwhile, driving bar 103 does not interrupt its movement and continues its return movement for the remainder of the five pitches, that is three pitches, and, when driving bar 103 corresponding to units, has attained its initial frontwards resting position, the slide of the same numeration order will be in position "3." In remembering, as hereabove described, that unratching bars 111 (Fig. 7) are provided with a salient 115 (Fig. 7) to retain the transfer bar 106 corresponding to the numeration order which is immediately superior, it will be understood, in considering the same example, that unratching bar 111 of the units, will have slid frontwards. Transfer bar 106, corresponding to tens, also under the action of spring 110, will drive upwards stud 105 which is fast with lever 104 corresponding to tens. Ratchet 107 will therefore cause mobile angle member 98 of tens to move frontwards one pitch, this value being in supplement to that determined by the return of the driving bar of the tens. Still considering the proposed example, slide 12 of tens of counting unit No. 4 belonging to the front section was in position "2," the driving bar of the same order then operates a return movement of "7" and, as hereabove described, lever 104, belonging to said driving bar, shifts and causes mobile angle member 98 to advance one pitch. The positioning of said slide should then follow ten pitches from its extreme rearward position, but, as hereinbefore indicated, between position "9" and position "10," slide 12 causes unratching shaft 119 as well as stop member of tens 117 to rotate so that the unratching bar of the same numeration order will rise and, during such a rise, will exert an effort on ratchet 107 of tens, to raise said ratchet 107, thus releasing mobile angle member 98 of the same order, which, in turn, will revert rearwards ten pitches in the same manner as the units angle member reverted, with the difference that in the case now considered, the slide 12 will remain in its extreme rearward position. At the same time, transfer bar 106 corresponding to hundreds, being no longer stopped by unratching bar 111 of tens, will also slide and will drive lever 104 of the driving bar of hundreds, which, as in the case of tens, will cause the mobile angle member 98 of hundreds to move frontwards the supplementary pitch. Finally, slide 12 of hundreds of counting unit No. 4, belonging to the front section of the machine, was at one pitch from its extreme position. The return movement of driving bar of the same order has a value of two pitches and the supplementary advance, caused by rocking of lever 104 of hundreds, being one pitch, the slide will have advanced 1+2+1=4 pitches, with respect to its extreme position.

In conclusion, slides 12 of counting unit No. 4 belonging to the frontward section will have made the following addition:

$$128+275=403$$

Phase VI

*Disengagement.*—Addition of sum 275 having been made in both front and rear sections of the machine and positioning of the slide having been accomplished, the slides 12 must be disengaged from mobile angle members 98 and $98_1$ and be locked to fixed angle members 65 and $65_1$. This happens in the following manner:

In considering Figure 6, shaft 39 continuing to rotate, tooth $63_2$ of cam 63 cooperates with nose of lever 62 which rocks in applying through lever 61 and roller 60 a pressure on bar 56 which causes a new rocking of rollers 55 and $55_1$ fast with levers 54 and $54_1$, as well as of shafts 52 and $52_1$ and of locking devices 53 and $53_1$ (Figs. 1, 1a and 4). The rocking of locking devices 53 and $53_1$ releases shaft 16 whereas plates 17, $17_1$ and 18, $18_1$ are acted upon by springs 42—$42_1$ and the unit thus formed, rocks, so that fingers 15 and $15_1$ which cooperated with noses 180 and $180_1$ of counting units No. 4 of the front section and No. 9 of the rear section no longer act on said noses, and triangles 13 and $13_1$ are released. Slides 12 are no longer submitted to the action of mobile angle members 98 and $98_1$ and are locked in engagement with fixed angle members 65 and $65_1$ under the action of springs 64 and $64_1$ (Fig. 5).

Phase VII

*Resetting.*—Resetting of mechanical transfer members which have operated and the return to the rest position of function selecting members and of counting units are carried out in the following manner:

Cam 38 Figs. 2 and 2a driven by the rotation of shaft 39 cooperates with lever 37, which by means of rod 36 causes lever 35 to rock, as well as lever 34, with which it is fast, in order that levers 33 and $33_1$ may cooperate with rollers 32 and $32_1$, which causes a frontward sliding of bars 31 and $31_1$. At this moment, cross bar 30 (Figs. 2 and 2a) drives frontwards stop bars 91, 28 and $28_1$ (Figs. 1, 1a and 4) which are respectively acted upon by springs 84, 164 and $164_1$. Said stop bars therefore return to their resting position. On their side, angle bars 167 and $167_1$ drive mobile angle members 98 and $98_1$ up to their extreme front position, whereas slopes 168 and $168_1$ exert an upward pressure on levers 169 and $169_1$ thus causing levers 170 and $170_1$ to rock, together with rake-shaped members 172 and $172_1$. In their rocking movement, said rake-shaped members (Fig. 7) exert a pressure on salients 115 and $115_1$ of unratching bars 111 and $111_1$, which on the one hand, permits nose 116 of said bars 111 and $111_1$ which have operated a transfer, to pass behind stop members 117 and, on the other hand, permits the return to ratching position of ratchets 107 and $107_1$, as well as of counter-ratchets 108 and $108_1$. Meanwhile, salients 115 and $115_1$ will also bring back to their resting position the transfer bars 106 and $106_1$ which have operated transfers. Shaft 39 having terminated its rotation, will be stopped by the self-unclutching device E, and the machine is ready to record a new operation.

SUBTRACTION

Subtracting operations are operated through adding the complement to "9" of the amount to be subtracted, with one unit in the lowest numeration order, from which is subtracted one unit in the highest numeration order. This operation will be more clearly explained by means of the following example:

Number "275" is to be subtracted from counting unit No. 9 of the rear section and from counting unit No. 4 of the front section, the slides of the first one being at "+368" and those of the latter at "+93."

Operator depresses the counting unit keys and the keys of the amounts to be added, as described in the adding operation and furthermore depresses the subtraction key $92_5$ visible in Figure 4. He starts the motor, shaft 39 rotates and the cycle develops as described for addition. However, the fact that key $92_5$ has been depressed gives rise to a certain number of modifications hereafter indicated.

During Phase I, stop bar 91 (Fig. 4) will be stopped when tooth 184 cooperates with the rod of key $92_5$. Consequently, salient of stop bar 90 will stop the movement of stud 89 fast with lever 87, and this will stop plate 82 which was pulled by spring 84, and groove 85 will come on top of lever 75 which will then be released.

During Phase II as precedingly described, rocking of plate 81 was clear. Still considering Figure 4, it may be seen that lever 75 will rise, acted upon by spring 76, and nose 185 of said lever 75 shall be introduced into the way of plate 81 which is rocked. Said plate 81, continuing its movement, will end up in meeting nose 85 hereabove mentioned, on which it will exert a pressure and will then drive frontwards lever 75 and bar 69 on which said lever shifts; in Figure 8, the other nose 186 is visible. In its rocking movement, plate 81 will cause lever 187 to rock and slot 188 of said lever advancing in this movement will allow salient 189 to pass, said salient being provided on frame 190 on which stop bars 113 are fixed. Frame 190 is held by two rods 191 and two rods 192, rotatively mounted on the squares struts 4 and 5 (Figs. 2 and 2a). The unit thus formed is under the action of spring 193, which pulls said unit towards the left hand side of the machine (Fig. 8). Stop bars 113 are provided with two rows of teeth, one for the adding operation, the other for subtracting operations. When all the stop bars 113 have not rocked towards the left hand side of the machine, the adding teeth are opposite key rods 114 and operated as described in the adding operation. On the contrary, when said stop bars 113 have laterally rocked under the action of spring 193 such as now described, the subtraction teeth of said stop bars will be opposite key rods 114. Subtracting teeth are arranged on stop bars 113 in such a manner that they allow said stop bars, when the latter slide rearwards under the action of springs 135, to be displaced a length corresponding to a number of pitches equal to the complement to 9 of the order in which keys 114 will have risen in the keyboard. Key "1" will thus allow a sliding of 8 pitches, key "2" of seven pitches and so on up to key "9" which will lock corresponding stop bar 113 without allowing the return thereof rearwards. But, if no key is depressed in a determined row of the keyboard, the corresponding stop bar will slide a value of nine pitches since, on the one hand, the subtracting rocking of bars 113 towards the left allows all teeth 179 to be out of the vertical plane of the zero fingers 178 (Figs. 2 and 2a) and, on the other, stop pins 194 provided on guide-plate 102, limit the displacement of salients 133 of driving bars 103, said stop pins being placed exactly at a distance equal to nine pitches from said salients 133 when these are in their extreme frontward position.

During Phase III, in reconsidering the above example and in considering Figures 2 and 2a, it may be seen that the rod of key 5 of the units which has been depressed by operator will stop the corresponding stop bar through its tooth 195, rod 7 will perform the same operation through tooth 196 and rod 2 through tooth 197. The other stop bars 113 will not be stopped by any key rod of the keyboard, but will be stopped by pins 194, which, as above explained, allow a travel of nine pitches.

Phase IV is identical to Phase IV described for addition.

In the course of Phase V, the return of driving bars 103 and the transfer operations are performed in the same manner as in the adding operation.

Still considering the proposed example, slide 12 of the units of counting unit No. 9 belonging to the rear section, being at the position "8," and, on another hand, the driving bar having to operate a return movement of "4," corresponding to the complement of "9" to "5," slides 12 will be in position "2";

$$8+4=12$$
$$12-10 \text{ (return)}=2$$

A supplementary advance of one pitch will take place for slide 12 of tens in same counting unit No. 9 as described in the corresponding phase of the addition. Simultaneously, the driving bar of tens makes a return of "2" (complement to "9" of "7") and drives slide 12 of tens which already was on "6." Siled of tens will thus be in position "9," that is:

$$6+1+2=9$$

and will thus make no transfer in the order of hundreds. Slide 12 of hundreds which was in position "3" is driven by the return movement of the corresponding driving bar a value of seven pitches (complement to "9" of "2"). The transfer operation then takes place and said slide of hundreds will thus come to position zero:

$$3+7=10$$
$$0-10 \text{ (return)}=0$$

The slide corresponding to the fourth numeration order, which was at its zero position, will be driven by its corresponding driving bar a value of nine pitches plus one, equivalent to the transfer, that is ten pitches, less ten pitches (corresponding to the return) that is zero. The same movements will be reproduced in all the further numeration orders in which all slides 12 return to zero after having advanced $$9+1=10$$

and having comeback of 10 as hereabove described.

Stop numbers 117 such as shown in Figure 7 and corresponding to both the higher and lower numeration orders (the lowest being that of the units) are provided with arms 121 and 121₁ respectively connected by a rod 122, so that stop member 117 corresponding to the highest order will rock as above described, that of the lowest numeration order will follow this movement and will cease cooperating with nose 123 of the transfer slope of the order of units, which will cause the groove of said slope to rise and the consequence thereof will be the increasing of one pitch of the advancing movement of the mobile angle member which will position slide 12 of units at "3" instead of "2." Consequently the machine has performed in the rear section counting unit No. 9 the subtracting operation:

$$368-275=93$$

In counting unit No. 4 of the front section, it has been supposed that slide 12 of units was positioned at three pitches from its extreme rear position, that the slide of tens was at nine pitches and all other slides at zero, that is at their extreme rearward position. Through analyzing the movement which these slides will have to perform during the return of the driving bars 103, it will be seen that the slide of units will be driven four pitches frontwards and, since it had already advanced three pitches with respect to its normal position, it will thus stop at position "7." The slide of tens which was at "9" will be driven two pitches and will return ten pitches thus finally stopping at "1" and causing the slide of hundreds to advance one supplementary pitch. The slide of hundreds which was at "0" shall be driven frontwards of the machine seven pitches, plus the mentioned supplementary pitch, that is "8." All other slides which were at "0" will be driven by nine pitches through their corresponding driving bar 103 and will stop at "9." If the maximum capacity of the machine is supposed to be five numeration orders and in remembering that slides of account 4 of the front section were at "00093" if subtraction is made of the amount of 275 which, as explained in the addition of the complement to 9 of each figure, that is "99724," slides of counting unit No. 4 of the front section will be in position "99817," which represents the complement to "9" of each figure of the negative number resulting from the subtraction:

$$+93-275=-182$$

The other phases of the cycle comprise the same functions as those described in the addition chapter, but it should be remarked that, in the course of Phase 7, when stop bar 91 returns under the action of cross bar 30, a salient 198 of said stop bar 91 (Fig. 8) causes lever 199 rotatively mounted on frame 345 to tilt. This lever exerts a pressure on a nose 200 provided on frame 190, whereas spring 193 brings said frame back beyond its normal position, at the adding position towards the right hand side of the machine so that lever 187 pushed by a spring, not shown, returns the frame 190 to the adding position.

*Totalising-transfer.*—Operator depresses the keys of the selecting keyboard corresponding to the counting unit to be totalised in one section of the machine, and to the counting unit which is to receive the totals in the other section.

Operator also depresses the "total" key 92₂ or 92₄ according to the section containing the counting unit which is to be emptied, and starts motor M.

Shaft 39 will rotate and the machine will operate in the following manner, an example having been chosen in order to make things clearer.

It will be supposed that counting unit No. 4 of the front section is to be totalised, said counting unit containing a negative amount of "182," and that said amount is to be transferred to counting unit No. 9 of the rear section, which contains a positive amount "93."

Operator depresses keys 114₄ of the front section, 114₉ of the rear section (Figs. 1 and 1a), 92₂ of the keyboard of functions (Fig. 4) and starts motor M.

Shaft 39 will perform one rotation, during the phases of which the following movements will be produced.

Phase I develops in the same manner as in the adding and subtracting cases, with the difference that the stop bar of functions will be stopped by its tooth 225, cooperating with the rod of key 92₂.

Plate 82 (Fig. 20) will also be stopped at this moment despite the action of spring 84 and groove 85 will come above lever 74 thus released.

It has been seen hereabove that, during Phase II, the rocking of plate 81 (Fig. 4), enabled lever 74, thus released, to rise by cooperation of said plate 81 with nose 185 of said lever 74. This operation causes the frontward sliding of bar 67 which will exert a pressure on roller 55 which, in turn, will repel locking member 53, which releases nose 181 of bearing 18 (Figs. 1 and 1a) and simultaneously, spring 42 (Fig. 3). Said spring, already under action of slide 43 during the preceding phase, will cause shaft 16 to rock until one finger 15 cooperates with nose 180 of counting unit No. 4 of the front section and slides 12 of said counting unit are disengaged from the fixed angle member 65 to engage with mobile angle members 98.

During the frontward progression of bar 67, an angle member 202 (Figs. 20 and 8) fast with said bar 67 rocks a lever 203 rotatively mounted on a stud fast with the square strut 5. This lever 203 then causes tilting bar 204 to slide to the right hand side of the machine, said finger causing in turn the tilting of all zero fingers 178 and all stop flaps 338 and 339 which are in relation with the keyboard of operation amounts (Fig. 21). The effect of any such key 114, which could have been depressed by mistake, will thus be cancelled and at the same time the way will be open to stop bars 113 which are caused to progress rearwards in the course of the following phase of the same cycle.

It has already been seen that in the course of Phase III, cross bar 137 moves out of the way in order that driving bars 103 may slide rearwards of the machine under action of springs 135 (Figs. 1 and 1a). This movement of bar 137 will take place while counting unit No. 4 of the front section cooperates with mobile angle members 98 and while counting unit No. 9 of the rear section is still locked through its angle member 65, since bar 67, as described above, has unlocked only locking member 53 of the front section, and not locking member 53 of the rear section.

In considering the cited example, it will be seen that during said Phase III, slide 12 of the units of counting unit No. 4 of the front section which was ahead seven pitches with respect to its extreme rearward position cannot be displaced more than seven pitches, since stop plate 162 will lock, after a displacement of seven pitches, all of the movable members of the units, as well in the front section as in the rear section. Slide 12 of the tens will lock the mobile members of said numeration order after a displacement of one pitch, that of the hundreds after a displacement of eight pitches and all other slides after a displacement of nine pitches. In other words, the movable members, after the mentioned displacements and with respect to their extreme rearward position, will be at two pitches for the units, at eight pitches for the tens, at one pitch for the hundreds and at zero for all other numerating orders, whereas all slides of counting unit No. 4 of the front section will be at the zero pitches.

In the course of Phase IV, tooth $63_1$ of cam 63 (Fig. 6) cooperates with lever $62_1$, this resulting in a displacement towards the front of the machine of bar 56 so that lever 54 rocks, causing the locking member of the rear section to be released. Locking member 53 of the front section was already released in the course of Phase II. Consequently, the fixed angle members 65 cease cooperating with counting unit No. 9 of the rear section and mobile angle members $98_1$ will then cooperate with said counting unit, as already described.

It has already been mentioned that, in the course of Phase V, cam 50 releases lever 48 (Fig. 3), thus causing springs 46 and $46_1$ to act. Concerning the front section, spring 46 will be able to draw slide 43 frontwards and said slide 43 will cooperate through its arm 44 with roller 41, thus rotating bearings 17 and 18, the latter not being locked by locking member 53, and the result thereof being that, the nose 81 of counting unit No. 4 no longer cooperating with a finger 15, will be under the action of spring 64 and mobile angle members 98 will cease cooperating with it, the fixed angle member 65 now performing this operation.

It is easy to see how this counting unit has been totalised, i. e. all its slides 12 brought back to their extreme rearward position and locked in this position.

Development of Phase 6 is identical to the adding operations. If the above example is taken again, slide 12 of units of counting unit No. 9, belonging to the rear section of the machine and which was, during the preceding phase at three pitches from its extreme rearward position, will be driven 7 pitches frontwards, that is 10 in all, thus causing transfer operations to be carried out as above described, and there follows a return of 10 pitches of slide 12 of units which will take up position zero, as well as an advance of one pitch of the slide of tens.

Now, said slide of tens, which was at nine pitches, will be driven one pitch, to which should be added the transfer of one pitch and substracted the return of ten pitches. Consequently, said slide shall take up position "1" and at the same time, will cause the slide of hundreds to advance one pitch. Said slide of hundreds, which was at zero, will be driven eight pitches, plus a transfer of one pitch, which will cause it to advance nine pitches in all. All other slides 12 corresponding to higher numeration orders will be driven nine pitches and, since no prior transfer exists, they will be stopped at this extreme frontward position.

During this phase and considering Fig. 6, tooth $63_2$ of cam 63 will again engage with the nose of lever 62, which will cause the counting unit No. 9 of the rear section to be disengaged and the corresponding slides to be locked in their resting position, as above described.

Resetting, during Phase 7, of all members which have determined a transfer, operates in the same manner as described for addition. Referrring to the given example, it should be noted that slides 12 of the front counting unit No. 4 and rear counting unit No. 9 were, before the above described totalising cycle, respectively in position "—182" and "+93" whereas, at the end of said cycle, they respectively are in positions "0" and "—89", that is "99.910" representing the complement to "9" of each of figures "0," "0," "0," "8" and "9."

Consequently, it should be noted that, in a machine according to the present invention, the number of slides 12 of each counting unit, as well as the number of driving members and fast locking angle members must be greater by 1 than the number of numeration orders which are to be represented in the machine.

Said slides and supplementary members are arranged not only to cooperate with transfer members of the lowest numeration order, by means of rod 122, but are also arranged to determine the positive or negative feature of the material operation, through position of the slides corresponding to the numeration order. For example, position "09345" of the slides of a counting unit will correspond to a positive number, whereas position "90654" will correspond to the same number, but the latter will be negative. In the same manner position 00000 of the sides of a counting unit corresponds to zero considered as a starting position of positive quantities, whereas position "99999" also corresponds to zero, considered, this time, as a starting position for negative quantities.

In this manner, a machine built according to the present invention, may accumulate positive or negative amounts, corresponding to the depressed keys in the key-board of two counting units belonging to different sections of the machine, whether the sign of the amount of the operation to be carried out and contained in one or the other of the counting units be positive or negative. In the same manner, said machine may accumulate, in a counting unit belonging to one section, all the operation amounts contained in the counting units belonging to the other section, regardless of the positive or negative characteristic of either counting unit.

In considering Figs. 8, 2 and 2a, it may be seen that stop bars 113 are provided wth two slopes 205 and 206 which cooperate with sliding members 207 (Figs. 1, 1a and 2, 2a), one of said sliding members being provided for each numeration order. Said sliding members cooperate with printing bars 208 through arms 218. Printing type bars 209 are rotatively mounted on printing bars 208 and the whole unit formed of said members is maintained upwards by springs, not shown, and downwards by a cross bar 210, which cooperates with printing cams 211 (Figs. 1 and 1a) fast with a shaft 212 rotatively mounted on the intermediary flange 8 of the machine, on the one side, and on the other, on bearings fast with printing plate 213 secured on the square strut 6.

Said shaft 212 is provided with a lever 214 provided with a roller 215.

During Phases 4 and 5 of the cycle, precedingly described, when ratchets 147, cooperating with shaft 146 as above indicated, maintain teeth 145 of the movable members driven by bars 103, a cam which up to now cooperated with roller 215 in order to maintain, as indicated, the printing cam 211, ceases cooperating with said roller and consequently, said printing cams 211 rise under the action of a spring, not shown. At this moment, members 207, arms 218, bars 208 and printing type bars 209 follow the rising movement until hooks 217 provided on members 207, are applied against a tooth of slopes 205 and 206. The width between these teeth on said slopes is calculated in such a manner that the printing character which will show up to be stamped on a roller 219 (Figs. 2 and 2a) will be a function of the horizontal rearward advance of the corresponding stop bar 113.

It has already been seen that stop bars 113 progress rearwards a number of pitches which is proportional to the figure represented by the depressed key in adding, and inversely proportional to said figure in subtracting, and that all stop bars 113 are displaced laterally towards the left hand side of the machine when said machine operates a subtraction. Teeth 205 and 206 are fixed on stop bars in such a manner that in case of addition when the stop bars have not been displaced towards the left, the corresponding hook 217 cooperates with slope 206, the height of the teeth of which increases proportionally to the advance of said bar in adding position and that in the case of subtraction, when said stop bars are displaced to the left, hook 217 cooperates with slope 206, the height of the teeth of which decreases in the same proportion. In consequence, both in addition and in subtraction, printing character bars 209 will progress upwards proportionally to the figure represented by the key depressed by the operator, thus printing the real number of the complements to "9" of said figures.

It has also been seen that for a totalising operation, each stop bar 113 progresses rearwards of the machine a number of pitches equal to the complement to "9" of the position of the slide corresponding to the moment where the totalising cycle starts.

The printing of the totalised amount is carried out in the same manner and at the same moment of the cycle as in adding operations. In Fig. 8, lever 187 is provided with a nose 220 cooperating with stop 221, of a bar 222 parallel to stop bars 113 and circulating in the same frame 190. Said bar 222 is provided with two notches 223 and 224 cooperating with printing characters in the same manner as scales 205 and 206 but placed at different heights, so that height of scale 224 causes the printing of sign "+" and that height of scale 223 causes printing of sign "—" by a printing bar, as described for the printing of the results of the operations.

In case of a negative amount, for instance "99.761," bar 222 will be displaced 9 pitches and stop 221 causes lever 187 to tilt so that the grove 188 being no longer locked, frame 190 moves to the left under the action of spring 193. When upward displacement of printing bars 207, 208 and 209 takes place the right hand scales 206 and 223 will operate since result scales 206 are decreasing and the movement of the stop bars towards the rear of the machine is operated in proportion with the complement of the real totalised amount. Printed figures will correspond to the real totalised amount and not to a complement. In the example, position "99761" will be printed in the form "—238."

Let us now consider a positive amount, for example "00238." At the moment of totalising bar 222 will not progress rearwards so that stop 221 will not cause lever 187 to tilt and the latter will continue to maintain frame 190 in its position towards the right hand side of the machine. When printing member 207, 208 and 209 progress upwards, the left hand side notches 224 and 205 stop the hooks 217. Since the result scales 205 are increasing, the printed figures will correspond to the real amount of the displacement of the sides; in the example, position "00238" will be printed as "238."

*Sub totalising-transfer.*—It has been seen that for totalising operations, operator depresses keys 92₁ and 92₃; for operations of sub-totalising, keys 92₂ or 92₄ must be depressed, according to the section containing the counting unit to be sub-totalised.

As may be seen in Fig. 4, stop bar 91 will be stopped by tooth 225 or 225₁ and at that moment groove 85 of plate 82 will stop above lever 74 or 74₁. Levers 74 and 74₁ are provided with a supplementary arm 77 and shaft 39 is provided with a cam 226 fast with said shaft which during Phase 4, precedingly described, will cause lever 227 to tilt. Said lever 227 is provided with a roller 229, the operation of which is the following. When one of levers 74 or 74₁ is pushed back towards the front of the machine by the plate 81, roller 229 will cooperate with supplementary arm 77 which then causes arm 74 or 74₁ to tilt, according to the case. Said lever thus tilted will no longer be engaged with plate 81, and bars 67 or 68 (Fig. 20) will come back to their resting position under action of springs 70 or 71. At this moment locking members 53 or 53₁ (Figs. 1 and 1a) will cease being driven by bars 67 or 68 and will lock plate 18 so that disengagement of the sub-totalised counting unit will not be brought about in the course of Phase 5 but only in the course of Phase 6 when tooth 63₂ of cam 63 cooperates with the nose of lever 62 (Fig. 6).

In these conditions, slides 12, instead of being locked at the extreme rearward position of the machine, as in the "total" operation, are brought back, in the course of Phase 5, to the position which they occupied at the beginning of the operation, before being disengaged.

Printing on a roller 219 of the transfers in sub-total is performed in the same manner as precedingly described. Stop bars 28 and 28₁ (Fig. 8), as above explained, cooperate in the selection of the counting units. Said bars are provided with notched slopes 342 for bar 28 and 343 for bar 28₁. Said notched slopes cooperate with the printing members in the same manner as that described for notched slopes 205 and so that the number of the selected counting unit will be printed next to the registered amount. Stop bar 91 is also provided with a notched slope 344 which cooperates in the same manner with printing members and which has for its object to print, next to the number of the selected counting unit, the symbol corresponding to the function which has been selected by means of keys 92₁, 92₂, 92₃, 92₄, 92₅ (Fig. 4). These function symbols may be represented by letters or figures and in order to simplify the description, the following examples have been chosen.

O: for registering operations of positive amounts and for which none of the keys 92 are to be depressed (Fig. 4):

◊ for the registering operations of negative amounts for which key 92₅ should be depressed;

TAV for totalising operations of front section counting units and for which key 92₄ is to be depressed;

TAR for totalising operations of rear section counting units for which key 92₂ should be depressed;

STAV for sub-totalising operations of front section counting units for which key 93₃ should be depressed;

STAR for operations of sub-totalising of rear section counting units for which key 92₁ should be depressed;

By means of the combination of selecting members for calculation and printing such as described, all the numerous functions capable of being carried out by the machine, are controlled by the operator by means of a keyboard for selection of functions 92₁ to 92₅ (Fig. 4) and of a keyboard for selection of counting units 93₁ 93₉ (Figs. 1 and 1a) in order to pre-select any combination of functions and of counting units and to operate any calculation or printing operation thus pre-selected by depressing corresponding keys after having started motor M.

If the same examples are taken once again, it will be seen that one line

O  9  4  275 printed by the machine, would indicate that a sum of "275" has been introduced positively in rear counting units No. 4 forwards and No. 9 rearwards, keys 93₉ and 93₄ corresponding to the respective sections having been depressed.

A line reading $$\Diamond \quad 9 \quad 4 \quad 275$$

indicates that the same sum has been introduced in both mentioned counting units, but negatively, operator having depressed the same selection keys for the counting units and, furthermore, key $92_5$.

In the same manner:

$$O \quad 0 \quad 4 \quad 275$$

would indicate that sum 275 has been introduced positively in the front counting unit No. 4, without affecting any of the rear counting units and in this case, key $93_4$ only would have been depressed.

If the printed line reads:

$$STAV \quad 9 \quad 4-182$$

this indicates that counting unit No. 4 of the front section has been totalized and that its balance "182" has been transferred negatively to counting unit No. 9 of the rear section. Keys $93_9$ corresponding to the rear section and $93_4$ corresponding to the front section, as well as key $92_4$ have been depressed.

A line reading $$TAV \quad 0 \quad 4-182$$

indicates that the same counting unit has been totalised in the same manner but that its negative balance "182" has not been transferred to any counting unit of the rear section. For carrying out this operation, front keys $93_4$ and rear keys $92_4$ have been depressed.

A line reading $$STAR \quad 9 \quad 4+89$$

would indicate that counting unit No. 9 of rear section has been totalised and that its balance 89 has been transferred negatively to counting unit No. 4 of the front section, the depressed keys being rear $93_4$ and front $93_4$, as well as $92_2$.

Finally, a line such as $$STAR \quad 9 \quad 4-89$$

would indicate that the operation would be one of sub-totalising, the depressed keys being rear $93_9$ and front $93_4$, as well as key $93_3$.

All possible combinations may be pre-selected in the same manner, in order to carry out any operation or series of operations, accounts, tabulations statistics, or others.

As shown at Figs. 1, 1a, 2, 2a, 22 and 15, printing roller 219 is rotatively mounted between two parallel flanges 230 and $230_1$ of a rocking member and fast with a shaft 231 rotatively mounted in holes provided in both parallel flanges 232 and $232_1$ of the frame of a carrier. Said flanges 232 and $232_1$ provide, together with two bars 233 and 234, a rigid frame inside which the unit composed of shaft 231, flanges 230 and $230_1$, and roller 219 may rock. A spring 235 pulls parallel flanges 230 and $230_1$ upwards, but the effort of this spring is limited by two hooks 236—$236_1$ provided respectively on flanges 230 and $230_1$, which hooks cooperate with two ratchets 237—$237_1$ fast with a shaft 238 rotatively mounted on flanges 232 and $232_1$. Two handles 239 and $239_1$ effect the movement of flanges 230 and $230_1$, in opposition to the action of the spring 235, so that after engagement of ratchets 237 and $237_1$, roller 219 remains in its printing position. Another lever 240 is rotatably mounted on flange $232_1$.

A nose 241 of said lever 240 is provided to release the ratchets 237 and $237_1$, and in this case, the parallel flanges 230 and $230_1$ will obey the action of spring 235 and will rise again, thus permitting the front feeding of sheets which are to be printed by the machine. Rails 242 and 243 are fixed to flanges 2 and 3 of the machine (Figs. 1, 1a, 2, 2a, 14, 15 and 16), said rails being arranged to cause the carrier to slide by means of rollers in any known manner. A cross bar 244 is fixed by its ends to flanges 232 and $232_1$ and a rack 245 slides on said bar; a toothed wheel 246 engages rack 245 so that when the wheel turns clockwise, the carrier moves to the right and when the wheel turns counterclockwise, the carrier moves to the left. A rod 247 is rotatively mounted at the extreme left of the rack 245 and at the other end of said rod is also rotatively mounted a lever 248 which is connected to a support 249 fast with the left flange 232. Rod 247 can be extended by means of a slot and spring, shown in Fig. 15. At the upper part of lever 248 is fixed a stud 250 which cooperates with another stud 251 fast with a lever 252 rotatively mounted on the left parallel flange 230. Rack 245 slides on bar 244 as above explained, but this sliding is limited by devices known per se, such as shouldered shafts and slots. On another hand, said rack is permanently under the action of a spring 253, the other end of which is fixed on bar 244 of the carrier.

When wheel 246 starts to move counterclockwise, as the machine is viewed from the rear, as illustrated in Figure 15, said wheel moves the carrier to the left as above explained, but before causing said displacement, said wheel 246 will have caused the sliding of the rack on bar 244. Lever 248 will rotate clockwise and stud 250 cooperating with stud 251 and lever 252 will follow immediately. Lever 252 is provided with another stud 253 fixed in such a manner with respect to the rocking center 254 that it will displace a slide 255 with which it can cooperate through a stud 256 fast with slide 255. Slide 255 is fast with parallel flange 230 and is provided with a nose cooperating with a ratchet-wheel 257 fast with the printing roller and provided to rotate said roller by an angle corresponding to the desired spacing of lines.

In the above description, it has been indicated that wheel 246 could rotate both ways. Said wheel is driven by an electric motor and controlled by a clutch the description of which is given hereafter.

A plate 258 is fast with base 213 and is provided with a shaft 259 around which rotates a pinion 260. Said pinion 260 is driven by toothed wheel drives by a pinion 261 fast on the end of reductor shaft 262. Pinion 260 drives two toothed wheels 263 and 264 which cooperate in such a manner so that wheel 264 rotates clockwise and wheel 263 counterclockwise. This disposition is visible in Figure 15 which shows the machine as seen from the rear. Both wheels are mounted in socket shaped members 265—266, set on plate 258 and each provided with two triggers 267 and 268 rotatively mounted in gaps provided in the body of said wheels perpendicularly to their plane of rotation. A second plate 269 is connected through struts 270 to the plate 258. Two ratchet wheels 271 and 272 fast with pinions 273 and 274 cooperate with wheel 246 which drives rack 245. Two shafts 275 and 276 are slidably mounted inside sockets 265 and 266 and are provided with washers 277 and 278 entering grooves provided at the end of triggers 267 and 268. According to the sliding position of said shafts 275—276, the noses of triggers 267 and 268 may or may not cooperate with the corresponding ratchet wheel 271 or 272. A third plate 279 is connected to plate 269 by means of struts and is provided with horizontal bearings in which a shaft 280 may oscillate. Said shaft 280 is provided with a double arm forming a rocker 281, provided with two studs 282 and 283 which enter grooves provided in rollers 284 and 285 fast with shafts 275 and 276.

The disposition of the transmitting and unclutching members, which has been described, shows that if shaft 262 always rotates in the same direction, for example clockwise when looking at the machine from the rear, according to Figure 15, two positions of rocking member 281 will determine the rotating direction of wheel 246 controlling the movement of the carrier.

If triggers 267 cooperate with ratchet-wheel 271, the latter will drive wheel 246 clockwise (looking at the machine from the rear, Fig. 15) and the carrier will be moved towards the right, ratchet wheel 272 then being loose on its socket.

On the contrary, if triggers 268 cooperate with ratchet-wheel 272, it is the latter which will then drive wheel 246 and the carrier will be moved to the left and in this case the ratchet-wheel will be loose on its socket. Rocking member 281, being rigid, will never be capable of cooperating at the same time with all clutching members.

As shown in Fig. 14, member 281 is maintained in position by balls 286 arranged in holes provided in bosses of plate 279 and maintained in their seats by means of springs shows in Fig. 14.

The two positions just described are the two extreme positions of rocking, but there may be an intermediary position, in which member 281 is parallel to plates 279 and 269.

The length of the noses of triggers 267 and 268 is calculated so that in this third position, none of the triggers cooperate with ratchet-wheel 271 nor with ratchet-wheels 272.

In this case toothed wheels 263 and 264 will rotate but wheel 246 will not follow this rotating movement and the carrier will remain at a standstill.

The control of the positions, i. e. the clutching of the driving members of the carrier, as they have been described, may be operated either automatically in the course of the cycle of the machine, or by an operator, with manual controls.

The automatic control operates in the manner described hereafter with reference to Figs. 1, 1a, 2, 2a, 16, 17 and 18.

Shaft 280 is provided with a fixed plate 287, said plate 287 being provided with roller 288.

On plate 279 are fixed two supports 289 in which a shaft 290 may rotate and slide parallel to its axis.

A lever 291 is fast with shaft 290 and its lower end is provided with roller 292 whereas its upper end cooperates with roller 288, either on the left of its axis, or on the right, according to the axial position of shaft 290.

As shown in Figs. 1, 1a and 2, 2a, printing shaft 212 carries a lever 293; said lever carries a rotatively mounted cam 294 acting as a ratchet and the angular position of which is controlled by a spring and a stop.

When cam 216 ceases cooperating with roller 215, shaft 212, as hereabove seen, rotates counterclockwise. At this moment, cam 294 passes under roller 292, but when cam 216 cooperates anew with roller 215 and thus rotates shaft 212, this time clockwise, a ratchet 294 will then repel roller 292 and lever 291 will rotate.

The end of lever 291 will cooperate with roller 288 either in its lefthand side part, or in its righthand side part, according to the axial position of shaft 290 and rocking member 281 will follow this rotation, acting either upon triggers 267 or upon triggers 268 and finally causing the movement of the carrier, either to the right, or to the left.

The manner in which the operator may give shaft 290 the necessary axial position in order that the carrier be moved in the desired direction, will be hereafter explained.

Bar 244 is provided with a tabulating bar 295 (Fig. 18) and said tabulating bar is fixed to bar 244 in a removable manner. As many tabulating stops 296 are provided as are necessary in order to stop the carrier at the interval required by the position of the columns of the document to be printed by the machine.

Two locks 297 are arranged on a plate 298 fast with plate 279. These locks can, on the one hand, slide lengthwise and, on the other, slightly shift around shafts 299 fast with plate 298. Two levers 300 are rotatively mounted on the inner side of a cover 302 fixed by means of struts to plate 298 and are maintained in their position by springs 303 attached to studs fast with plate 298. A rounded end of said levers 300 enters into a groove provided inside locks 297, so that said levers are pushed frontwards of the machine and such a movement is limited by studs 301. Two other levers 304 rotatively mounted on plate 298 are under the action of springs 305 and maintained in their position by studs 301 so that the edge 304₁ of said levers 304 exerts a pressure against locks 297 and thus maintains them in contact with stud 306 fast with plate 298. Thus, the locks are guided in their longitudinal movement. The above-mentioned self-unclutching members will be described more in detail hereafter.

When the carrier is moving, either to the left or to the right, a tabulating stop 296 will come into contact with one of the locks 297. Said lock will tilt longitudinally and disappear, under the action of the corresponding spring 303. The considered stop will apply against the other lock. Said other lock will receive a shock resulting from the inertia of the carrier, will tilt and thus drive corresponding lever 304 which is under the action of spring 305.

It should be remembered that rocking member 281 is in an oblique position with regard to plate 287, either under the action of automatic control as hereabove described, or under the action of manual control by an operator, as will be hereafter described. The effect of this positioning is that one of the studs 307 fast with said plate 287 will be very close to the bent edge 308 of corresponding lever 304, and when lever 304 tilts, its bent edge 308 will cooperate with corresponding stud 307, thus causing plate 287 to revert to its original position, parallel to rocking member 281.

Rocking member 281 will then exert a pressure on shafts 275 or 276 (Fig. 14) and triggers 267 or 268 will be disengaged from the corresponding ratchet-wheels 271 or 272 and the carrier will stop.

It is clear that, in order that this unclutching may take place, the carrier will have to be slightly beyond its stopping position, but at this moment the same lock 297 which causes the unclutching will cause the carrier to return to its correct position under the action of lever 304 which is under the action of spring 305 exerting a pressure on the tabulating stop.

It is conceivable that the rocking movement of plate 287 being too rapid, the carrier might be clutched in again in the opposite sense, as a result of the inertia of said plate 287, in the event that the corresponding ball 286 should not be sufficiently maintained by its spring to cause the rocking member 281 to stop in its neutral position. In order to do away with this risk, levers 309 are rotatively mounted on plate 298 and are provided at one end with heads 310 whereas their other end acts as a stop to studs 307. The weight of said heads is so established as to counterbalance the shooting action of plate 287 resulting from too fast an unclutching of the driving members.

In Figs. 16 and 17, the machine being seen frontwards, the left hand end of shaft 290 which, as already explained, may slide parallel to its axis, is provided with a sickle shaped plate 320 (Figs. 16 and 17).

The position of said plate 320 with respect to the left hand end of shaft 290 is so established that when said shaft 290 has slid to the right and lever 291 is able to rock roller 288, the upper edge of plate 320 cooperates with the bent edge of lever 300 and left lock 297 is driven back. The result thereof is that the carrier can be moved towards the left (to the right if Fig. 15 is considered) until the tabulating stop (Fig. 18) produces a self-unclutching action as hereabove described.

Shaft 290 being placed to the right, the carrier will move to the left, looking at the machine frontwards, or to the right if Figure 15 is considered.

The value of said tabulating movement will be determined by the position of the tabulating stops 296 which will have been fixed onto the tabulating bar 295. It should be noticed that these tabulating movements will not be accompanied by a line-space movement, i. e. by a rotation of roller 219, because rack 245 submitted to the action of rod 247 will exert a pressure on lever 248 in the opposite direction to that causing the line-space operation (Fig. 15). If the opposite direction is considered, triggers 268 will be engaged with ratchet wheel 272 and, in this case, rack 245 will be driven to the right (to the left if Figure 15 is considered) by wheel 246. Meanwhile, bar 295 is locked by locks 297 (Fig. 18); since this bar can not be moved, it is the rack 245 which will slide on cross bar 244, carrying out the line-space operation. The next movement, that is to say the self unclutching when the maximum slide of the rack authorised by the length of the slots is attained, is carried out in the above described manner.

Sliding of shaft 290 to the right or to the left is con-controlled by the operator by means of a lever 322 rotatively mounted on flange 3 of the machine and provided with a compensating device 318, comprising a lever, spring and rod 323.

When the operator pushes the lever to the right, shaft 290 slides to the left, thus setting the unclutching and driving members, above described, in a position for carrying out a line-space operation, whereas, pushed in the opposite way the same members cause a tabulating movement.

The three positions of the rocking member 281 causing the movement to the left or to the right or the standstill of the carrier, may be controlled by the operator by means of the devices hereafter described.

Fig. 17 shows a plate 311 rotatively mounted on cover 302 and provided with studs 312 which are capable, after plate 311 has rocked a certain amount of times, of cooperating in pushing either of studs 307 fast with plate 287 so that said plate 287, and, therefore, rocking member 281, may pass from a non-driving parallel position to an oblique driving position towards the left or the right.

Plate 311 is also provided with two cam-shaped edges 313 capable of cooperating with either of studs 314, fast with one or the other of levers 300, in order to cause corresponding lever 300 to rock a little before the clutching action is effectuated.

Tilting of one of the levers 300 has for its consequence, as hereabove seen, to drive back lock 297 in which said lever is engaged by its rounded end, so that tabulating stop 296 will be unlocked and allow the carrier to be moved in the desired direction.

A lever 315 rotatively mounted on flange 3 of the machine is provided with a compensating device 318 comprising a lever and a spring. Said lever 315 cooperates with a rod 316, connecting the end of lever 315 to plate 311. The handle of said lever enables the operator to control the clutching device in order to drive the carrier to the right or to the left, until the moment when the next tabulating stop causes the self-unclutching action as above described.

In the case of the operator desiring that the movement of the carrier be longer than that determined by the tabulating stops, either to the right, or to the left, he need only maintain his pressure on the handle, which results in causing the corresponding lock to be held back for a longer period.

Plate 311 is provided with a security arm 317; should the operator continue, by mistake, to indefinitely maintain the pressure on lever 315, this security arm would come back to its upright position under the action of stops opposing the action of spring 318, said stops being fixed on the ends of the carrier.

The clutching and unclutching device which has been described, operates as long as shaft 262 continues to rotate.

In order to avoid a continuous rotation, a switch 319 is provided, which applies voltage across the terminals of the motor only when plate 287 is oblique, or in a right of left driving position. In the intermediary or resting position, plate 287 cooperates with the blade of a contact to cut off the voltage across the terminals of said motor.

AUTOMATIC SELECTION OF COUNTING UNITS AND FUNCTIONS

It is possible to select the counting units otherwise than through keys $93_1$ to $93_9$ as explained above. With this object in view, selecting members are provided which cooperate with the carrier, according to the lateral positions of said carrier. As shown in Figs. 1 and 1a, levers 324 are rotatively mounted on a double support 326 fast with rail 242. Each lever 324 is provided on its upper arm with a roller $327_1$ to $327_5$. There are therefore as many levers 324 as there are decimal numerations in the number of counting units selected by the machine, for example if each section contains 99 counting units, there will be four levers 324. One supplementary lever 324 is provided for the selecting of the functions. On a base 328 fast with bar 233 are fixed, parallel and one on top of the other, selecting slides $329_1$, $329_2$, $329_3$, $329_4$ and 330. Each of these slides is provided, according to the position of the corresponding tabulating stop, with notches, the depth of which is proportional to the figure to which it corresponds in one one of the numeration orders. In order to automatically select for example counting unit 65, in the rear section, and counting unit 72 in the front section in a determined position of the carrier, a deep notch of six pitches is provided in slide $329_4$ and another deep notch of five pitches in slide $329_3$, as well as a deep notch of seven pitches in slide $329_2$ and a deep notch of two pitches in slide $329_1$.

Said notches are such that when the carrier is stopped by tabulating stop 296, indicating the desired tabulation, these notches are opposite the support 327 of the corresponding lever 324. Slide 330 operating the selection of functions will be notched in the same manner, but the notches provided in said slide, instead of corresponding to the figures of the number of the counting unit, will correspond to the pitch of keys $92_1$ to $92_5$ above mentioned. Vertically sliding members 331 are provided on appropriate guides fixed on the printing support 213. Said members are each provided with a roller 332 cooperating with the lower arm 334 of levers 324 and enabling members 331 to slide downwards a value proportional to the depth of the notch in the corresponding slide 329. Slides with catches 333 are fast with stop bars 28, $28_1$ and 91, so that when said stop bars are released by cross bar 30, they advance under the action of springs 164, $164_1$ and 84 respectively and this progressing depends upon the vertical sliding position of the corresponding sliding member 331. The proportion between the length of the two lever arms 324, as well as the shape of the profile of said lever arms will be calculated in order to establish the desired correspondence between the depth of said notches and the sliding of said stop bars 28, $28_1$ and 91.

It should be recalled that the different lengths of said sliding movement determine the selection of the counting units and the functions "total" and "sub-total" in each section of the machine and also that of the function "subtraction," in both sections at the same time.

What I claim is:

1. In a calculating machine having a frame, a carriage movable transversely of said frame, a printing roller adapted to hold a record sheet rotatably mounted in said carriage, and a tabulating bar mounted on and controlling said carriage, a positive control device for controlling the movement in both directions of said carriage, and the rotation of said printing roller, comprising an electric motor in the machine, two parallel flange plates held in said frame and having opposed inner faces, two intermeshing toothed wheels each mounted for rotation on an axially bored socket carried by the inner face of one of said flange plates, a pinion adapted to be rotated by said motor and engaging one of said toothed wheels, two ratchet wheels each mounted for rotation on an axially bored socket carried by the inner face of the other of said flange plates and respectively coaxial with said toothed wheels, two pinions fast with said ratchet wheels, respectively, meshing with a common driving wheel, said driving wheel cooperating with a rack mounted for sliding a small distance on said movable carriage, a shaft slidingly mounted in the axial borings of the sockets of each pair of said ratchet and toothed wheels, at least one triggerlike ratchet member oscillatingly mounted on each of said toothed wheels, on a shaft perpendicular to the axis of the bore of the socket thereof, and adapted to engage the corresponding ratchet wheel, means connecting each of said ratchet members with the corresponding slidable shaft, whereby the longitudinal movement of said shaft causes the corresponding ratchet member to alternately engage said ratchet wheel, a lever pivotally mounted in the frame of the machine and having two arms extending, respectively, in the vicinity of the said two sliding shafts, means connecting said arms of said lever with said sliding shafts whereby the oscillation of said lever causes the longitudinal sliding of said shafts in opposed directions, means for causing the said lever to oscillate in said frame, resilient means for locking said lever in three different positions corresponding, respectively, to the engaging of the ratchet member of a first of said toothed wheels with the corresponding ratchet wheel and disengaging of the ratchet member of the second of said toothed wheels from the corresponding ratchet wheel, to the disengaging of the ratchet members of both said toothed wheels from the corresponding ratchet wheels, and to the disengaging of the ratchet member of said first toothed wheel from the corresponding ratchet wheel and engaging of the ratchet member of said second toothed wheel with the corresponding ratchet wheel, means cooperating with said tabulating bar for locking the said carriage against longitudinal movement and for releasing said carriage, and means operable by said rack for imparting a fractional rotation to the printing roller.

2. A positive carriage control device for a calculating machine as claimed in claim 1, in which the means for locking and releasing the carriage comprise two opposed bevelled locking members, slidably arranged side by side on the frame of the machine and adapted to cooperate with tabulating stops of predetermined width on the tabulating bar, a longitudinal slot in each of said locking members, engaging a stud fast with the frame of the machine, a first pair of levers rotatingly mounted in the said frame, on either side of said locking members, resilient means for applying said levers on said locking members and pushing said locking members towards one another against a common spacing stud, resilient means for urging said locking members towards said tabulating bar, a shaft journalled in said frame of the machine and on which is keyed said two armed lever controlling said sliding shafts, a driving plate keyed on said shaft, and two studs on said plate adapted to cooperate with said levers urging said locking plates towards one another, in such a manner that a lateral movement of one of said locking plates, causing a rotation of the corresponding lever will cause a rotation of said driving plate, auxiliary means being provided to control the rotation of said driving plate.

3. A positive carriage control device for a calculating machine as claimed in claim 2, in which the auxiliary means provided to control the rotation of said driving plate comprise a roller rotatably mounted under said plate, a sliding shaft mounted for rotation and longitudinal sliding in the frame of the machine, a first lever keyed on said sliding shaft, having an extension adapted to cooperate with said roller and to cause the rocking of said driving plate, a second pair of levers rotatingly mounted in the frame of the machine, and engaging said locking members, respectively, each of the levers of said second pair of levers being urged by a spring, whereby the corresponding locking member is urged towards said tabulating bar, and a second lever keyed on said sliding shaft and adapted to cooperate with one or the other lever of said second pair of levers, according to the longitudinal position of said sliding shaft, means being provided for manually controlling the longitudinal position of said sliding shaft.

4. A positive carriage control device for a calculating machine as claimed in claim 3, in which the auxiliary means provided to control the rotation of said driving plate also comprise a control plate rotatably mounted in the frame of the machine on a shaft parallel with that of said driving plate, studs on said control plate adapted to engage laterally said driving plate, cam shaped edges on said control plate, adapted to engage studs provided on each of the levers of said second pair of levers, whereby the rotation of said control plate in one or the other direction causes the rotation of said driving plate in the same direction and the tilting of one or the other of the levers of said second pair of levers against the action of the spring urging said lever of the second pair of levers, and a rod connecting said control plate to a hand control lever oscillatingly mounted in the frame of the machine.

5. A positive carriage control device for a calculating machine as claimed in claim 1, in which the means for imparting a fractional rotation to the printing roller comprise a two armed lever oscillatingly supported by the carriage, one arm of said lever being resiliently connected to the said rack slidingly mounted on the carriage and the other arm thereof being adapted to act upon a control lever rotatingly mounted on the carriage and having a stud arranged for cooperation with a ratchet engaging a ratchet wheel fast with said printing roller, whereby the sliding of said rack in a given direction causes said ratchet to drive said ratchet wheel.

References Cited in the file of this patent

UNITED STATES PATENTS

| | | |
|---|---|---|
| 1,063,181 | Chapin | June 3, 1913 |
| 2,442,402 | Davidson | June 1, 1948 |
| 2,562,172 | Campos | July 31, 1951 |